(12) United States Patent
Spira et al.

(10) Patent No.: US 7,269,569 B2
(45) Date of Patent: Sep. 11, 2007

(54) METHOD OF PROVIDING MAINTENANCE SERVICES

(75) Inventors: Mario Cosmas Spira, Erlangen (DE); Erich Niedermayr, Vaterstetten (AT); Günter Menden, Heroldsbach (DE); Hans Klemme-Wolff, Dietikon (CH); Bernhard Sommer, Vienna (AT); Perry Michael Cavanagh, Calgary (CA); Kimberley James Pfeifer, Calgary (CA); David Leslie Williams, Port Coquitlam (CA); Michael Wilcox, Swanee, GA (US); Giuseppe Zancolich, Alpharetta, GA (US); Krzysztof Goly, Alpharetta, GA (US); Jürgen Stübiger, Erlangen (DE); Jörg Tautrim, Beckingen (DE); Michael Taylor, Dorchester (CA)

(73) Assignee: Siemens Aktiengesellschaft, Munich (DE)

( * ) Notice: Subject to any disclaimer, the term of this patent is extended or adjusted under 35 U.S.C. 154(b) by 766 days.

(21) Appl. No.: 09/810,351

(22) Filed: Mar. 16, 2001
(Under 37 CFR 1.47)

(65) Prior Publication Data
US 2002/0035495 A1    Mar. 21, 2002

Related U.S. Application Data

(60) Provisional application No. 60/190,170, filed on Mar. 17, 2000.

(51) Int. Cl.
*G06Q 10/00* (2006.01)
(52) U.S. Cl. .............................................. 705/7; 705/8
(58) Field of Classification Search ................... 705/8, 705/9, 10, 7
See application file for complete search history.

(56) References Cited

U.S. PATENT DOCUMENTS

| | | | | |
|---|---|---|---|---|
| 5,216,612 | A * | 6/1993 | Cornett et al. | 700/96 |
| 5,311,562 | A * | 5/1994 | Palusamy et al. | 376/215 |
| 5,687,212 | A * | 11/1997 | Kinser et al. | 379/9.03 |
| 6,301,339 | B1 * | 10/2001 | Staples et al. | 379/93.01 |
| 6,317,701 | B1 * | 11/2001 | Pyotsia et al. | 702/188 |
| 6,356,437 | B1 * | 3/2002 | Mitchell et al. | 361/683 |
| 6,421,673 | B1 * | 7/2002 | Caldwell et al. | 707/10 |

(Continued)

FOREIGN PATENT DOCUMENTS

JP    2001249964 A  *  9/2001

OTHER PUBLICATIONS

Bird, Paul, "Single Source Maintenance", Sep. 1993, Puchasing and Supply Management, Easton-on-the-Hill, p. 41, ProQuest ID 1393448.*

(Continued)

*Primary Examiner*—Beth Van Doren
*Assistant Examiner*—Jonathan G Sterrett
(74) *Attorney, Agent, or Firm*—Schiff Hardin LLP

(57) ABSTRACT

The method of providing includes providing an assessment of the maintenance and technical service needs of a plant, as broadly defined, and recommending services for outsourcing selected from a menu of services. The services are modular and may be mixed and matched to a customized fit with the needs of the plant. Categories of services are directed to technical services, motor maintenance, electro-mechanical services, etc. A generic approach to all plant maintenance provides a framework in which to offer the services. Services are offered throughout the life cycle of a plant. Particular industries are targeted for outsourced services.

12 Claims, 10 Drawing Sheets

U.S. PATENT DOCUMENTS

| | | | |
|---|---|---|---|
| 6,560,222 B1* | 5/2003 | Pounds et al. | 370/353 |
| 6,873,949 B2* | 3/2005 | Hickman et al. | 704/9 |
| 2002/0030604 A1* | 3/2002 | Chance et al. | 340/870.09 |

OTHER PUBLICATIONS

Tatum, Rita, "Online, all the time", Jan. 1999, Building Operations Management, vol. 46, Iss. 1, p. 31, 4 pages, ProQuest ID 38108414.*

Schimoller, Brian K, "Outsourcing plant maintenance", Feb. 1998, Power Engineering, v102n2, pp. 16-22, Dialog 01594278 02-45267.*

"Partner to Compete", Mar. 1999, Transmission and Distribution World, Dialog 04150887 54417559.*

Laios, Lambros, "An Empirical investigation of outsourcing decisions", Winter 1999, Journal of Supply Chain Management, vol. 35, Iss. 1, p. 33, ProQuest ID 39247590.*

Dunn, Richard L, "Exploring Outsourcing", Mar. 1999, Plant Engineering, vol. 53, Iss. 3, p. 123, ProQuest ID 39627191.*

Venkatraman, N, "Beyond Outsourcing: Managing IT Resources as a Value Center", Spring 1997, Sloan Management Review, pp. 51, 38, 3, ABI/INFORM Global.*

DiRomualdo, Anthony; Gurbaxani, Vijay, "Strategic Intent for IT Outsourcing", Summer 1998, Sloan Management Review, pp. 67, 39, 4, ABI/INFORM Global.*

Monnier, Jean-Baptiste; Coe, Andy; Camateros, Styli; Komblith, Mike, et. Al, "Viewpoints Q/A: How will technology impact the world's ambitious global infrastructure goals in the next century?", Fourth Quarter 1998, MicroStation World, vol. 4, Iss. 4, p. 18.*

Avery, Susan, " AMR lands the medal!", Sep. 15, 1998, Purchasing, vol. 125, Iss. 4, p. 36, ProQuest ID 34153381.*

Hoplin, Herman P; Hsieh, George S.; "Outsourcing/Rightsizing for the 1990's", 1993, Industrial Management + Data Systems, vol. 93, Iss. 1, p. 18, ProQuest ID 1115687.*

Ireland, Paul, "Satisficing dependent customers: on the power of suppliers in the IT systems integration supply chains", 1999, Supply Chain Management, vol. 4, Iss. 4, p. 184, ProQuest ID 86923247.*

Mandakas, Anthony; "Siemens—a world class maintenance provider", "Siemens Metals, Mining & More", Nov. 1996, 2nd Edition, p. 4.*

"Cost Savings through integral plant maintenance", Aug. 1, 1997, ABIX/LexisNexis Australia, Electrical World, p. 6 (article discusses the use of Siemens 'SiMain' integral plant maintenance package).*

"Siemens Maintenance Increases Productivity at Australian Paper", Erlangen, Apr. 20, 1999, pp. 1-2.*

"Siemens Integral Plant Maintenance", © 1996, Siemens.com.au website from web.archive.org, Jun. 26, 1997. p. 1.*

"Siemens Industrial Systems & Technical Services", © 1996, Siemens.com.au website from web.archive.org, Feb. 11, 1997. p. 1.*

"Siemens Technical Services Department—workshops", © 1996, Siemens.com.au website from web.archive.org, Jun. 26, 1997. p. 1.*

"Siemens Technical Services Department—engineering", © 1996, Siemens.com.au website from web.archive.org, Jun. 26, 1997. pp. 1-2.*

"Siemens Technical Services Department—Field Services and Repair Center", © 1996, Siemens.com.au website from web.archive.org, Jun. 26, 1997. p. 1.*

"Siemens Technical Services Department—Projects and Installations", © 1996, Siemens.com.au website from web.archive.org, Jun. 26, 1997. p. 1.*

"Siemens Technical Services Department—Condition Monitoring Services", © 1996, Siemens.com.au website from web.archive.org, Jun. 26, 1997. pp. 1-2.*

"Siemens Technical Services Department—Industrial Systems", © 1996, Siemens.com.au website from web.archive.org, Jun. 26, 1997. pp. 1-2.*

"Cost Savings through Integral Plant Maintenance", Aug. 1997, Electrical World (published in Australia), v.62, No. 7, p. 6.*

* cited by examiner

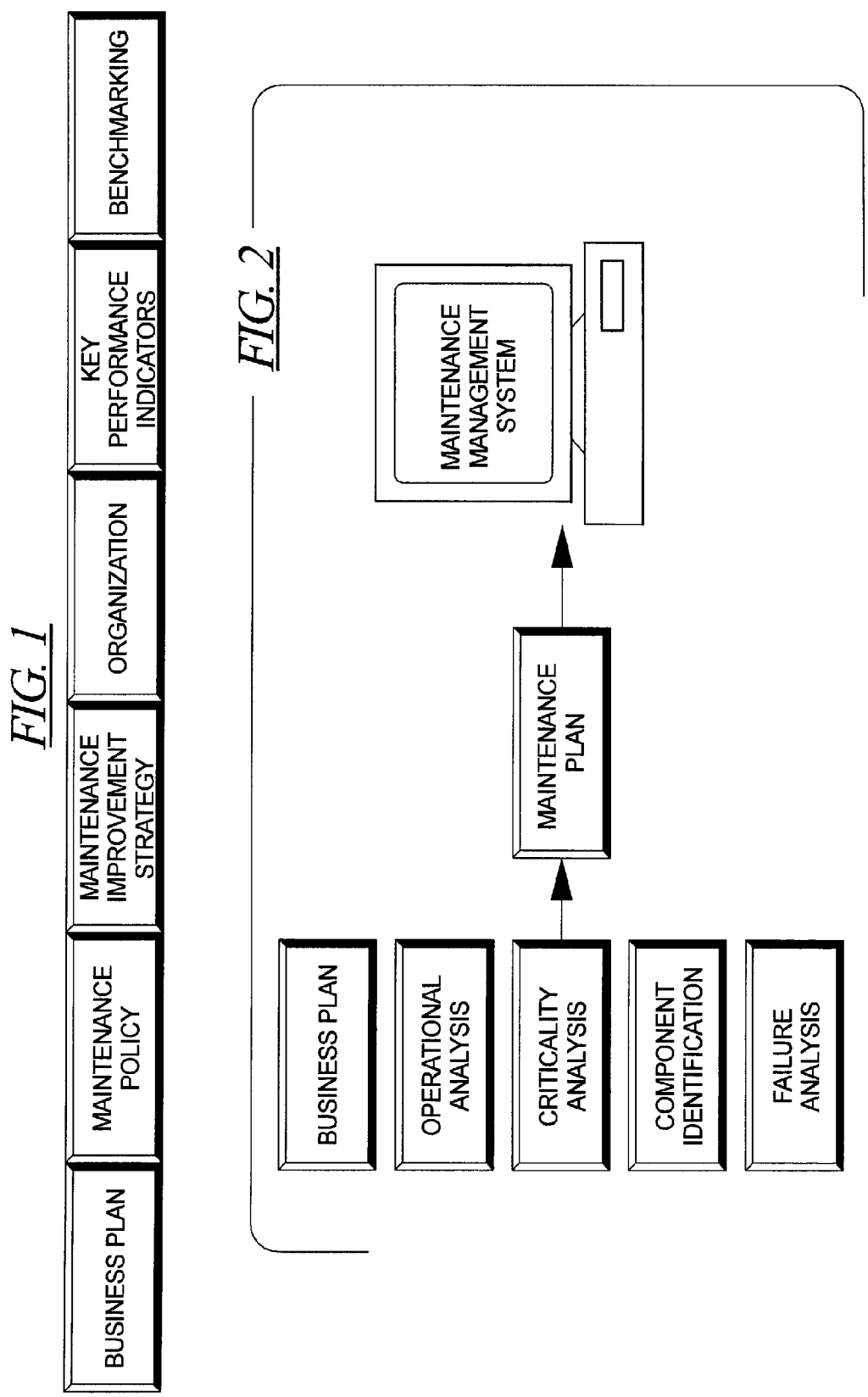

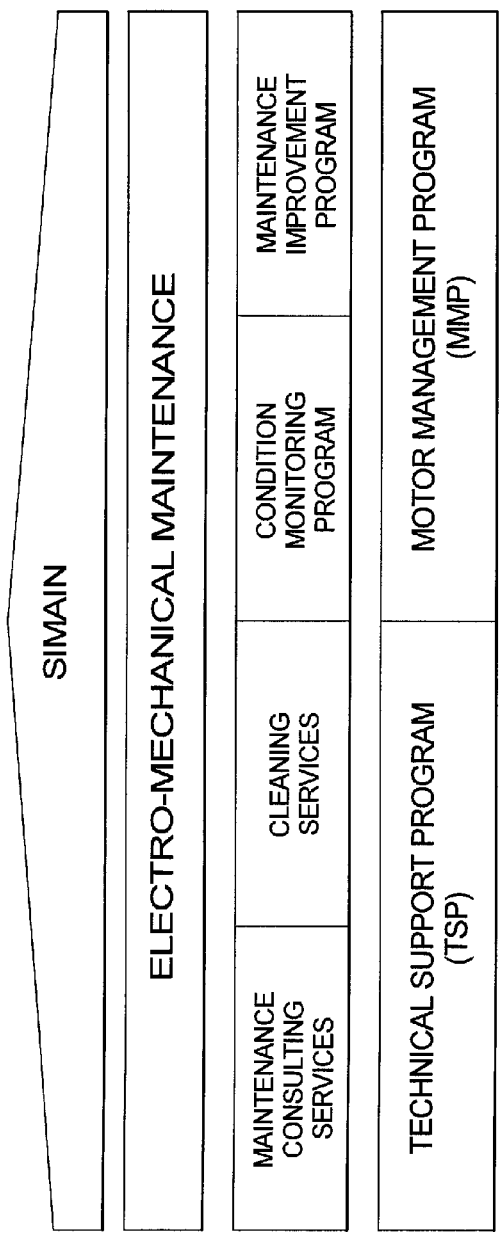
*FIG. 4*
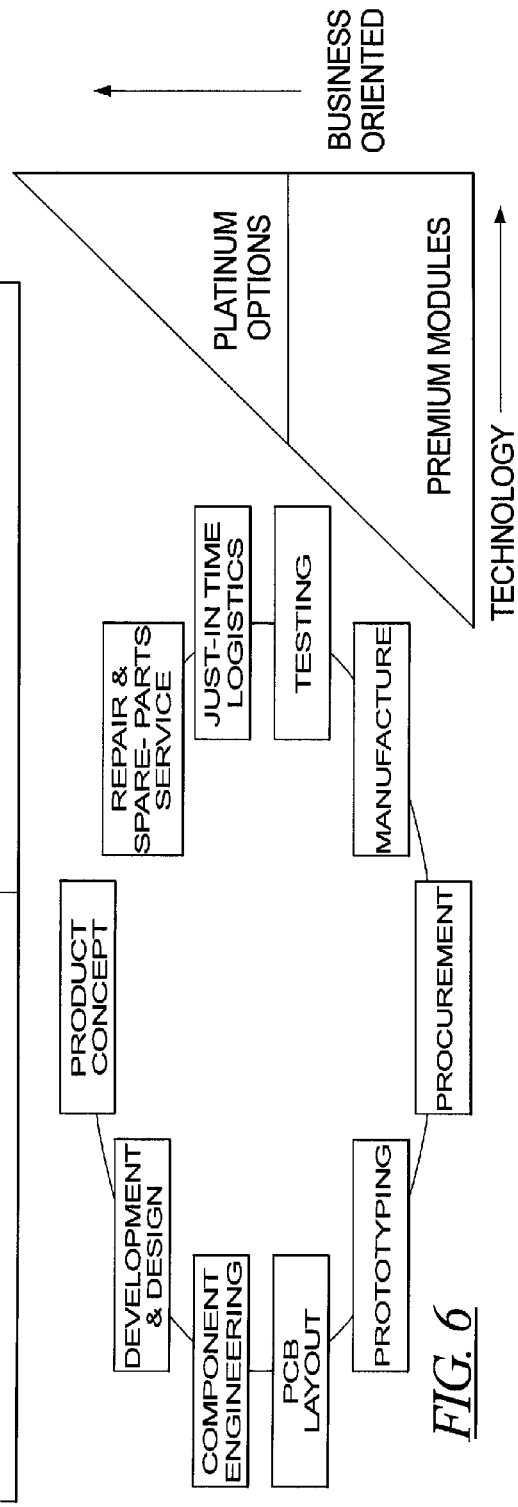
*FIG. 5*
*FIG. 6*

FIG. 8

TOTAL OR PARTIAL OUTSOURCING

| | | | | |
|---|---|---|---|---|
| MAINTENANCE AND MANAGEMENT | DEVICE AND COMPONENTS | MOTORS | | |
| | | TRANSDUCERS | | |
| | | ............ | | |
| | SYSTEMS | DEMINERALIZER | | |
| | | AIR CONDITIONING VENTILATION | | |
| | | ............ | | |
| | SUBSIDIARY PLANTS | BOILER | | |
| | | TURBINE | | |
| | | ............ | | |
| | COMPLETE PLANT | | | |
| OPERATION AND MANAGEMENT | SYSTEMS | OBJECT SAFETY | | |
| | | CLEANING | | |
| | | ............ | | |
| | SUBSIDIARY PLANTS | SECONDARY PLANTS | | |
| | | WATER/STEAM CYCLE | | |
| | | ............ | | |
| | COMPLETE PLANT | | | |

FIG. 10

MOTOR MANAGEMENT PROGRAM - PREMIUM MODULES

| ON-SITE MOTOR SERVICES | SUPPORT SERVICES | INVENTORY MANAGEMENT SERVICES | CONSULTING & ENGINEERING SERVICES | INFORMATION MANAGEMENT |
|---|---|---|---|---|
| CONDITION MONITORING | OVERHAUL, REPAIR & REWIND | INVENTORY OPTIMIZATION & REDUCTION | APPLICATION ENGINEERING | SYSTEM DESIGN AND INTERFACE |
| 24 HR. EMERGENCY RESPONSE SERVICE | MOTOR UPGRADE | STORAGE & MAINTENANCE | RELIABILITY IMPROVEMENT | MOTOR DATA MANAGEMENT |
| PREVENTIVE & CORRECTIVE MAINTENANCE | REPLACEMENT MOTOR SUPPLY | SHARED INVENTORY | MOTOR CONDITION ASSESSMENT | |
| | | INVENTORY RELIABILITY VERIFICATION | MOTOR MANAGEMENT REVIEW | |

PROGRAM MANAGEMENT

*FIG. 11*

| TECHNICAL SUPPORT PROGRAM - PREMIUM MODULE ||||
|---|---|---|---|
| SUPPORT SERVICES | ELECTRICAL DISTRIBUTION SYSTEM SERVICES || AUTOMATION & DRIVE SERVICES |
| POWER SYSTEM STUDIES | SWITCHGEAR & SWITCHBOARDS | EMERGENCY SYSTEMS | CONTROL SYSTEMS |
| CONDITION MONITORING | CABLE & BUSWAY | GROUNDING SYSTEMS | SCADA SYSTEMS |
| TRAINING | CIRCUIT BREAKERS & LV, MV, HV, SWITCHES | TRANSFORMERS | DRIVE SYSTEMS |
| ROUTINE OPERATIONAL CHECKS | DIRECT CURRENT SYSTEMS | CAPACITORS & REACTORS | AUTOMATION SYSTEMS |
| EMERGENCY RESPONSE | PROTECTIVE DEVICES | METERING & ENERGY MGT. | MOTOR CONTROL SYSTEMS |
| PROGRAM MANAGEMENT ||||

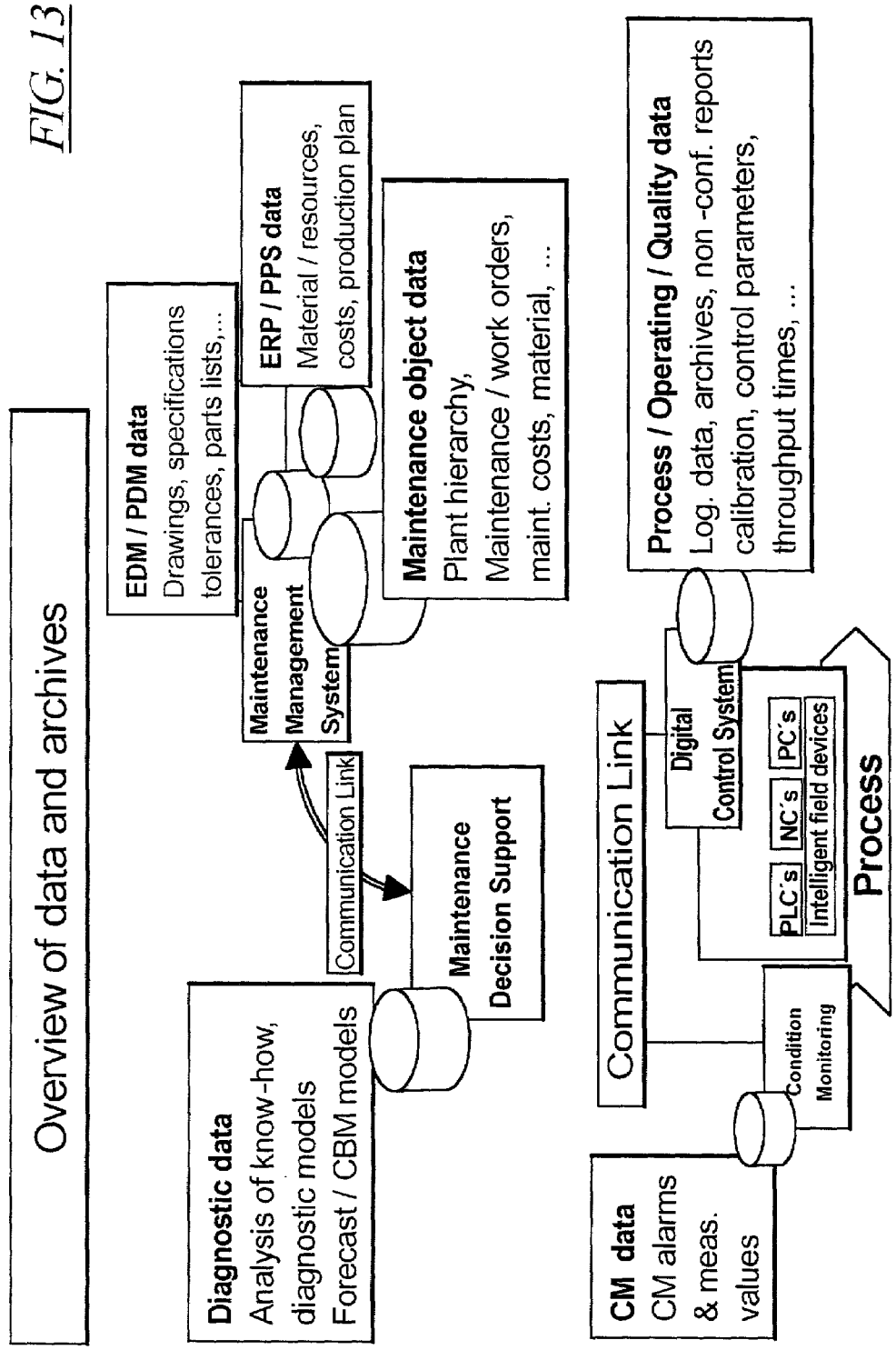

METHOD OF PROVIDING MAINTENANCE SERVICES

CROSS-REFERENCE TO RELATED CO-PENDING APPLICATION

This application claims the benefit of U.S. Provisional Application No. 60/190,170, filed Mar. 17, 2000.

BACKGROUND OF THE INVENTION

1. Field of the Invention

The present invention relates generally to a modular system of providing technical services and maintenance services to customers, for example plants and facilities.

2. Description of the Related Art

As global competition increases and supply chains become shorter, businesses are being forced to find new ways to increase plant performance while simultaneously reducing costs. Complexity of the business adds to the costs, and one area of significant complexity for manufacturing businesses is plant maintenance. In addition to adding complexity, maintenance can make up anywhere from 5-40% of the total costs of production. While maintenance is critical to the business outcome, it is often regarded as a necessary evil, and as a result it has been difficult to achieve sustained improvement in performance from an in-house maintenance group without intense management effort that detracts from the core business process.

SUMMARY OF THE INVENTION

In the present system, a customer desiring maintenance services or technical services is provided a menu of available technical services from which to select desired technical services. A uniform service architecture is provided. Modules are provided at various business levels are provided, from the general to the specific. In one embodiment, three levels are provided.

Electronic system plans are employed, potentially based on CAD data, electronic handbooks, Excel lists and a standard organization software CMMS (Computerized Maintenance Management Systems). This software is respectively employed at a location of a specific customer. An Enterprise Asset Management System (EAMS) is utilized between the individual locations, and the Enterprise Resource Planning System is located over the whole thing, this running, for example, on the basis of SAP program technology. The individual programs run an a Unix or Windows NT basis; they are implemented either in the computer system of the customer system or on servers of the respective provider center, for instance a Customer Service Center. However, monitoring by the respective Customer Service Center is always a feature, this center being in charge in a country or international regions as well, for example USA and Canada. Communication via the Internet with special measures for secure transmission are provided.

The present invention provides outsourced maintenance as a part of a business strategy. The outsourced maintenance includes plant design and construction, plant operation, and taking a plant out of service and tear-down of the plant. The maintenance services offered also fall into the broad areas of technical services, consulting, repair service, parts supply, etc. The customer needs are evaluated and the customer is offered the services as modules selected from a menu. The modules, which are implemented through software modules and hardware, are installed at a local level in each plant. However, operation and control of the service is provided through regional facilities that are linked to the local facilities by a communication connection, such as through the Internet. The regional facilities are provided at regions around the globe so as to offer 24 hours support to the local service locations, including providing a regional center in the Far East, one in the European Union, and one in a NAFTA country. One of these regional centers are open during business hours at any time of the day to provide support for the local service locations. The regional centers are in turn connected via communication links to a single world-wide headquarters.

Decisions on maintenance services are divided between the global, regional or local level. Business strategies for the customer, choices of modules to use, etc. are preferably made on the global level. Regional level decisions are determined by regional laws and regulations, manpower availability, etc. The local level is the plant level wherein decisions at that level are specific to the needs of that plant.

Within the context of the present application, maintenance services refers to and includes all those services described herein.

The invention addresses the challenges being put to companies by reducing complexity, enabling greater focus on the core business. One area of significant complexity for manufacturing businesses is plant maintenance.

The present invention delivers professional maintenance services throughout the world, not only for systems and installations, but for all machinery and equipment. The present invention utilizes vast worldwide technical expertise and presence.

Businesses face increases in productivity demands and international competition while striving to keep up with technical developments. The present invention provides outsourcing of numerous internal processes as a cost effective and asset effective strategy. The outsourced services cover the entire life cycle of a plant, from planning, erection and commissioning through fault elimination and corrective maintenance including plant modernization and maintenance. The present invention also provides services associated with disposal and recycling of old plants.

One of the services offered under the present business method is providing general contracting and plant construction services including turnkey, firm price manufacturer and on time delivery of plant sections and complete plants. Consulting services regarding the planning and design of the plant are also available.

As a further service, on-call and logistic services provide dependable requirement-oriented fault elimination of product systems and plants. Field service staff is available at the plant and repair services carry out necessary repair work at repair centers while on-line service centers communicate directly with the technical plants. Logistics services ensures that the correct parts are provided.

BRIEF DESCRIPTION OF THE DRAWINGS

FIG. 1 is a flow chart of a plan for plans according to the present invention;

FIG. 2 is a flow chart of further aspects of the present invention;

FIG. 4 is a schematic illustration of a structure of an electromechanical maintenance plan;

FIG. 5 is an illustration of two level of modules available according to the present invention;

FIG. 6 is a flow chart of product development;

FIG. 8 is a menu of outsourced modules according to the present invention;

FIG. 10 is a menu of modules available under a motor maintenance program;

FIG. 11 is a menu of modules available under a technical support program;

FIG. 13 is a functional block diagram of data processing according to the present invention;

DETAILED DESCRIPTION OF THE PREFERRED EMBODIMENTS

Figure 3:
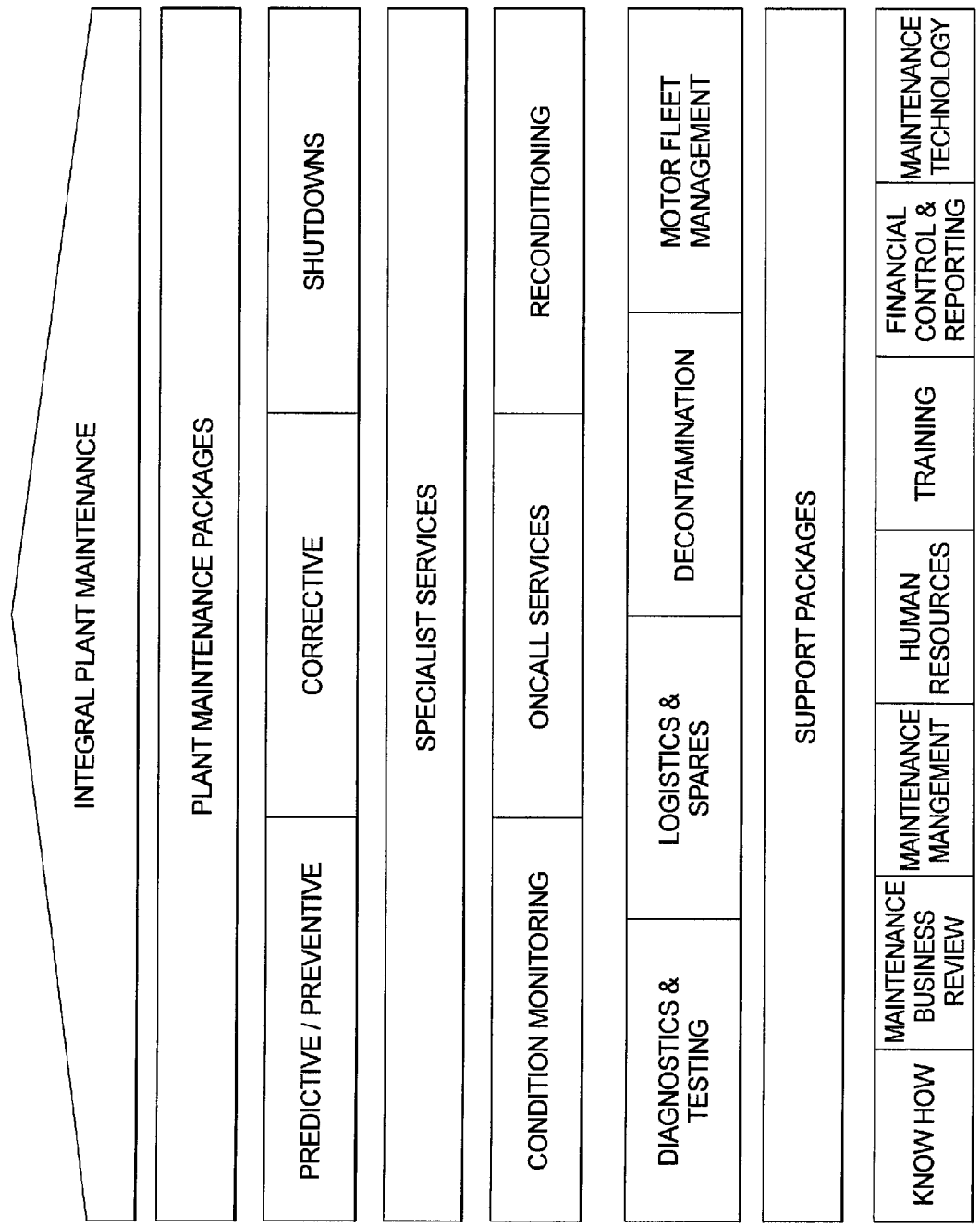
FIG. 3 is a schematic illustration of an overall structure of a plant maintenance plan.

An objective of the present invention is to provide fitness for plants which permits the plants to run faster, longer and better. In this regard, the invention provides plant maintenance and auxiliary process management. Other aspects provide general contracting, on-call and logistics service, information technology industry solutions, electronic manufacturing services, and knowledge management, all under the umbrella of industrial services.

The invention is accomplished by maintenance outsourcing. It uses a structured approach, unique processes and procedures, individually customized solutions, defined agreed maintenance strategies, thereby reducing complexity, adding greater focus and improved performance and a reduced cost. As a result, performance is increased while at the same time costs are decreasing, thereby increasing profit.

Utilization of the present method of business based maintenance improves performance so that plant profitability is increased by 10-50% and maintenance costs are reduced by 10-30%. The present invention is finds utility in a range of industries, including automotive plants, chemicals, mining, postal services, pulp and paper, steel, and water treatment.

The present invention provides integral plant maintenance with world wide support, with maintenance services just a phone call away at, for example, 296 locations in 69 countries.

According to the present method, the customer comes together with the provider in an alignment to move toward business objectives through a performance based contract. The business objectives of the customer are considered, then a unique package is developed to meet those objectives. The strategy development creates a partnership focused on a win/win outcome for both parties.

Performance-based contracts are used to reinforce the alignment between the parties and ensure the win/win outcome. The performance based contracts form an integral part of the partnership. In this arrangement, the rewards to the contractor are measured by key performance indicators and reflect the success of the relationship. The nature of the key performance indicators will depend on the type of the contract and the objectives of the business and are agreed in consultation with the customer. On a total outsourced contract for integral plant maintenance, these can include safety, plant availability, and reduced operating costs. The weighting of the individual components depends on their importance to the customer's business.

The present invention utilizes what is referred to as a fitness plan, as shown in FIG. 1. First, a business plan is developed, which aligns maintenance to business objectives. It is developed at the executive level and communicated to all. Next, a maintenance policy is developed, which establishes the rules for carrying out maintenance. It is set jointly by production, engineering and maintenance. After that, a maintenance improvement strategy is developed, which determines jointly the strategies required to improved plant performance and reduce costs. An organization step is provided, wherein is established the optimal organization to meet the plan while minimizing overhead. Key performance indicators are developed that measure performance against key requirements. Lastly, benchmarking is performed to measure performance against competitors and others. Thus, the present invention provides a six step approach to implementing a fitness plan to a plant.

Using the present invention results in a shift in reliability. Instead of reactive maintenance which goes into operation when there is a breakdown, taking a firefighting mode of operation with inadequate preventive and predictive maintenance plans, the present invention takes a pro-active reliability approach, with preventive schedules and a high degree of planning and scheduling. Predictive maintenance technology and analysis is utilized instead of a high degree of unscheduled maintenance. Rather than short term strategies of less than one year, long term maintenance improvement strategies are developed. Whereas insufficiently trained personnel have been used in the past, well trained personnel are now put to the job. Cost predictability goes up, inadequate systems are replaced, root cause failure analysis is performed, detailed measurement and reporting replaces the inadequate reporting, and a strong leadership is put in place. This results in both an increase in productivity and an increase in reliability.

Real bottom line results are delivered, including increased capacity from existing fixed assets, reduced costs both for production and maintenance, improved on-time delivery of products and reduced inventory.

To assist a customer in determining where they are in the reactive/pro-active maintenance scale, a maintenance business review is conducted, either after a strategic overview or an in depth analysis. The outcome of the review is used to determine how to proceed.

Thus, the present invention provides a systematic approach. The right tools for the right job are provided according to FIG. 2. The business plan, the maintenance policy and the improvement strategy inputs are linked to the actual plant components to produce the maintenance plan. The plan forms the basis of the maintenance management system. It defines maintenance actions, frequencies and methods for every part of the plant.

As shown in FIG. 3, the present invention permits the customer to choose the package that best suits the customer's needs, from total outsourcing through to individual specialist services. Integral plant maintenance is provided by total outsourcing of, for example, electrical equipment, mechanical equipment and plant building, including: strategy development and optimization, predictive condition-based maintenance, preventative maintenance, corrective maintenance, planned shut-downs, spare parts management, labor management, maintenance management systems implementation and optimization. All of these are aligned to the customers needs through performance based contracts.

As shown in FIG. 3, the integral plant maintenance not only includes the plant maintenance packages that meet the customers' needs in any combination of predictive and preventative maintenance, corrective maintenance, and planned shut-downs, but also utilize specialist services. The specialist services take advantage of the expertise of the provider including: condition monitoring, vibration, thermography, ultrasonic, oil analysis, motor current, and alignment; as well as on call services for equipment malfunction; reconditioning services for motors, switch gear, transformers, compressors and other equipments; diagnostics and testing from high voltage to electronic circuitry; logistics and spare parts management which minimize working capital; decontamination services for electronic PCB's and electrical equipment; and motor management which provides logistics and spare parts management, maintenance, energy reduction, and even financing packages.

This allows a customer not only to compete at the highest level for an extended period by not only having superior skills but also reliability of performance. This requires a clear goal, a training plan with an improvement strategy to keep ahead of the competition, along with a support team and a measure of the customer's and their competitors performance.

In addition to plant maintenance, the present invention also provides auxiliary process management, electromechanical components and switchgear maintenance, infrastructure installation maintenance and power plant maintenance.

Since every structure needs a strong foundation, maintenance is no exception. The foundation as shown in FIG. 3 constituting support packages that provide benefit to the customer. The support packages include maintenance management which provides strategy development and optimization, policy development, and systems. A maintenance business review is a further support package through which a bench mark of the current organization is performed and used to build an improvement plan. Know-how is a support package which ensures that best practices and experience are shared by establishing an Intranet based information network.

As a further component of the support packages, maintenance technology provides the latest technology in condition monitoring, online sensors, and decision analysis tools. Training is performed at all aspects of maintenance. A further foundational element is financial control and reporting, which provides prompt, comprehensive analysis of past performance and future projections. Lastly, the human resources support package provides for employment and management of the people performing the maintenance operations.

The foregoing support packages provided to the customer enables the customer to benefit from worldwide experience of the provider in a wide range of industries.

All aspects of maintenance work are supported according to the present invention. Maintaining an industrial plant requires a combination of skills and resources to meet the varying needs of the business. For instance, day-to-day first-line maintenance including emergency corrective work, cleaning, adjusting and monitoring of plant health is provided. Routine planned maintenance on a corrective, preventative, predictive and reliability basis are also provided, as well as major outages for plant overhaul or modifications.

Thus, the present invention provides customized solutions to meet the needs of the customer. This includes the use of the customers own operating personnel to carry out all or part of the first line including inspections, lubrication and other activities as part of a total plant management based philosophy.

The present invention can be used in car manufacture, chemical production, gas processing and collection, mining, nuclear research, oil and gas industries, open cut coal mining, paper manufacturing, parcel handling centers, cold rolling steel mills with processing lines, telecommunications, thermal power stations, and water and sewage treatment. The present invention is versatile in that it provides custom designed integrated maintenance services covering every type of plant and equipment, irrespective of manufacturer and technology involved. According to the present method, full responsibility for maintenance of all or just part of the plant is taken, emergency services are provided to compensate for work force shortages and breakdowns, specific plants and machines are operated and maintained, and maintenance consulting and optimization is provided.

The business solution provided by the present maintenance organization is tailored to the needs of the customer and can utilize the resources of the provider or integrate those provider resources with the existing work force into a new structure. A team-based organizational structure ensures full involvement of all personnel. Reward schemes are utilized for employees which are aligned to the performance based structure for the business as a whole so as to ensure a common focus throughout the whole team.

Under the present method, a pool of experts is available to provide the customer with the best practice know-how derived from many projects within a company. High performance communications systems are mobilized with expert knowledge of many skill centers operated throughout the world.

Motivated teams of workers are allowed extensive autonomy through a flat organizational structure so that a high degree of customer focus is provided with bench marks that set key performance indicators which in turn characterize the way the maintenance personnel approach their work.

Proven maintenance strategies are utilized to move from a reactive to a proactive maintenance approach. A maintenance management system is set up that will improve analysis and reporting providing a performance plus factor. Innovative diagnostic tools include the use of state of the art measurement and diagnostic systems which enable the accurate identification of the condition of the plant and its machinery.

The provider of the maintenance services view maintenance as a core business, providing a core competence in the field that yields a quicker implementation.

According to the invention, individually customized contracts may define the extent of the services to be provided, the transfer of staff, the performance related bonuses, define responsibility for plant operations, and even include sale and leaseback schemes for transfer of subplant and warehouse stocks. Spare parts distribution and after sales service are also available in an international distribution network of replacement parts which are available on an urgent need basis in the event of breakdown. Service centers are open twenty-four hours a day every day of the year in countries throughout the world.

Flexible organization structures are utilized in plant automation through knowledge of typical technologies in use irrespective of manufacturer. Specialization outside the experience of the provider taps other specialists outside the company, preferably local specialists.

Electromechanical Maintenance

The present invention provides electromechanical maintenance as one aspect of the maintenance services offered according to the present invention. Under the invention, maintenance is an investment to be optimized and not a cost to be minimized. Industrial maintenance services are offered in accordance with the present invention as single modules or as complete solutions including managerial and consulting services. The services under the present invention include maintenance business review, a maintenance improvement program, business based maintenance strategy development, computerized maintenance solutions, and asset condition review. The maintenance business review utilizes standardized procedures and assessment criteria to review and benchmark the current maintenance operation of the customer. The review covers three main categories, including management responsibility, maintenance systems and procedures, and personnel and resources. As many as twenty-two performance indicators are evaluated in detail, providing a starting point for an improvement program.

Under the maintenance improvement program, an environment of change and improvement is created in the existing maintenance department. Improvement programs are established as the result of the maintenance business review which will cut overall long term costs and improved reliability. Among the aspects of the maintenance improvement program are: aligning the maintenance strategies to the business objectives, improving planning and scheduling, optimizing workload management, improving the utilization of a computerized maintenance management system, better management of materials, and establishing a training and employee development program.

The business based maintenance strategy development aspect of the present invention is a process which first defines the critical equipment and maintenance needs in terms of the business goals of the customer. The next step is to develop uniquely tailored maintenance strategies that will help the customer reach the customers objectives. The strategies developed are pro-active strategies which are complemented by modem monitoring technologies to improve equipment reliability and provide an impact at the bottom line of the business.

As a further aspect of the invention, an asset condition review is performed by an on-site audit of equipment to evaluate equipment condition, provide a comprehensive preventative maintenance program, implement predictive maintenance techniques, and evaluate expected equipment performance. As a further review, the asset value of the equipment, the life expectancy thereof, the spare parts availability, and replacement costs are considered.

According to the invention, computerized maintenance solutions offer an efficient maintenance operation using computers to plan, schedule and record maintenance work. The computers run software for such tasks which is also capable of handling materials management and spare parts logistics. The success of the computerized maintenance management system relies on activities such as design, selection, installation, population and staff training. Populating the software with the data from the planning phase requires a significant man-power effort. Under the present invention, this man-power effort is provided as a service to the customer in a combined maintenance and information technology function. In a preferred development, the provider has at hand intensive understandings of special applications and relevant industrial experience, and works hand-in-hand with the maintenance provider. One aspect of the computerized maintenance solution is to deliver and implement interfaces to the enterprise resource planning system of the customer for purchasing an access control systems, materials and document management systems and condition monitoring systems.

As a result of these advances, the business strategy of the customer takes into account the ongoing changes resulting from globalization, technical advances and increasing competition. Best maintenance practices help reduce costs, increase plant availability, and improve product quality.

Electro-Mechanical Maintenance

Electromechanical maintenance according to the present invention is provided as professional services with predictable costs, which increase plant availability, provide cost reductions through efficient operations and high employee motivation, benefit from worldwide best-practice know-how of the provider, gain flexibility in management and operation of the customers plant, obtain access to a global service network operating twenty-four hours a day every day of the year, and reduce expenses for administration and logistics.

Under the present invention, a business based maintenance is provided following a comprehensive approach with results oriented equipment management. Business needs are identified and then a tailored packages of services are developed to meet defined objectives. An efficient partnership is formed between the customer and maintenance services provider which is focused on a win/win outcome. The key performance indicators provides strength to performance based contracts by checking such things as availability, cost reductions, and safety. A shared profitability enhances the ownership of the customer and is a key strategy for management and employee success.

A significant feature of the present invention is the availability of maintenance modules for selection. Modular services are selected from a menu of services on the basis of those modular services which suit the customer's maintenance needs. As shown in FIG. 4, electromechanical maintenance includes maintenance consulting services these include a maintenance business review, asset and equipment audits, and work force development. A guiding principle is to know what is to know-how.

A further module available under the modular services is cleaning services. The cleaning services make the equipment more reliable. Under the present invention, cleaning services are available for dry, moist or wet cleaning, dry cleaning of high voltage electrical equipment online is provided. Cleaning of switching gear, transformers, electrical and electronic equipment is available as well. Further, decontamination and corrosion removal is one aspect of the cleaning services module.

A further module is a condition monitoring program. Using state of the art methods to assess the condition of the plant and the machinery such as thermography, vibration measurements, ultrasonic testing, partial discharge testing, oil and fluid analysis, and technical endoscopy, advanced warning of problems is provided.

A maintenance improvement program may be implemented which provides a continuous improvement of processes. Plant and work force productivity programs are put in place yielding higher skills of workers, more flexibility, and improved planning. Maintenance performance indicators are defined. The workload management is optimized and better materials management is provided as well. Improved utilization of CMMS is also provided under the maintenance improvement program.

Underlying the foregoing modules are two further programs, namely the technical support program and the motor management program. These are modular service packages that tailor the maintenance improvements to the budget of the business and to the business objectives. Benefits are provided including a reduced cost through pro-active business based maintenance, a minimized downtime, an optimized asset management including capital solutions and a fast response when and where the customer needs it.

The objectives of the programs are to maximize equipment and system reliability, optimize return on maintenance expenditures, reduce inventory investment, and improve cost avoidance. Two types of modules are available, as shown in FIG. 5. Basic modules provide a base and are technology oriented and cover basic maintenance needs. Atop the premium modules are high end options which take the customer to a business based maintenance solution tuned to the special needs of the business. The basic modules of the technical support program are designed to ensure that maintenance issues are detected and addressed at their earliest stages. This increases reliability as well as availability of power generation and distribution equipment and systems, automation systems, drive systems, control and instrumentation systems as well as information technology systems. The result is that the bottom line dollars of the business will increase. Under the motor management program, the basic modules include on-site services which offer proactive maintenance with preventive and predicted maintenance, planning and scheduling as well as emergency response. A further module is the support services module which optimizes motor reliability with overhaul, repair, rewinding of the motor windings and upgrade services. Another module is an inventory management service. This service includes rationalization, optimization, storage and maintenance of spare motors as well as a shared inventory program. A consulting and engineering services module is available to the customer which provides motor management assessment, motor condition reviews and reliability improvements. Yet another module is the information management module through which system design and interface is implemented as well as data management. Lastly, a program management module is offered which provides a focal point for the information management, improved tracking and reporting of performance, and establishes a modem work flow.

The high end options available according to the present invention offer additions to the management services for plant management. Among the modules offered as a high end option are capital improvement so that the present state of the assets are improved to maintain the condition and project financing. Performance contracting is available which utilizes an independent asset review, provides value added in valuation systems using key performance indicators and makes use of regular reviews to monitor the progress. Another high end option is the full coverage option by which replacement and reduction of equipment with predictable costs is provided. The equipment is replaced for free including labor over the entire the term of the service agreement.

The technical support program also provides high end options. Among those are reliability focused maintenance. This provides a proactive strategy by which an alignment to plant criticalities is made, root cause failure analysis is implemented both as condition based and as business focused. Another high end platinum option for the technical support program is routine operational checks. Daily monitoring of operational system parameters and review of work process efficiency is provided. An emergency response feature is another high end option module for the customer. Two emergency calls per year are included along with a customized response.

The motor management program of the present invention also includes a specific high end option. Energy optimization is implemented by a complete motor system review which results in optimization recommendations with the objective of project savings.

The best maintenance practice of the present invention puts the customer ahead of his competition allowing the customer to focus on his core business. Increased equipment availability and reliability are provided, while aligning maintenance to the business strategy of the customer and reducing maintenance costs. Eliminating the cost of unplanned shutdowns and optimizing asset management is also another advantage of the present invention.

The business based maintenance is a process that defines the equipment and maintenance needs in terms of the business goals of the customer. The next step is to develop a uniquely tailored maintenance strategy to help the customer reach their objectives. Working with the maintenance organization, the providers engineers and maintenance specialists assess the current situation and develop strategies based on the plants specific requirements. By working closely with the employees of the company, sustained improvements are achieved which leads to success.

In one aspect of the invention, the provider of these services is a manufacturer of products and systems as well as plants, and is a maintenance services provider with know-how. Such a provider offering modular services according to the present invention can keep the plant fully operational and the equipment up to date. A significant feature of the present invention is that the services are vendor independent.

Thus, customized maintenance services are provided for a business covering every type of plant and equipment irrespective of manufacturer or technology. Worldwide support facilitates success in the application of the present method.

Additional services offered according to the present invention are auxiliary process management, integral plant maintenance, maintenance for infrastructure installations, and power plant maintenance.

Electronic Services

The present invention also provides electronic services for customers to enable the customers to concentrate on core competencies. Outsourcing saves time and capital and releases resources. Individualized solutions to requirements of the business relating to electronics and associated services are offered so that the recipient of the services can enhance current products or embed electronic components by optimizing the functions or even turn to miniaturization by the introduction of new technologies.

The electronic services offered according to the present invention include development, design, procurement, manufacturer, testing, just-in-time logistics and repair service.

Economic state of the art solutions are provided for the electronic needs of the customer on an individually customized basis. Development and design of electronic solutions are provided in line with the customer requirements; manufacturer of electronic plug-in cards, equipment and systems are available, as are tailored service packages.

In an embodiment of the invention, the provider functions as an enhanced value partner for electronics, offering either partial or complete solutions which are oriented to the specific needs of the business. Customized solutions are built where standard solutions are not available or are of an inadequate scale. Through innovative creativity, commitment to a value enhancement partnership with mutual success prospects and a modular range of customer services lead to business success and increased profitability.

As shown in FIG. 6, a product concept initiates the product cycle which is brought to the development and design stage and then to a component engineering step.

Following PCB layout, a prototyping phase is undertaken after which procurement of the components are effected. This leads to manufacturing, followed by testing and just-in-time logistics. As a final step in the cycle, repair and spare parts services are to be considered.

Knowledge Management

Knowledge management is a further phase in the services of the present invention. By developing an employees know-how, the company gains a competitive advantage using knowledge-based services. One aspect of the present invention is to provide individually designed technical education and training programs according to the needs of the business using the latest methods and learning technologies.

Innovation cycles are becoming shorter and demand for continuing learning is increasing. An organization faces a huge challenge to keep the knowledge level up to date. It is necessary to provide practice oriented training and innovative learning methods to develop a business's know-how. One aspect of the present invention provides seminars, guided practical training, and workshops for technical know-how in engineering, commissioning, maintenance and software development. The training program offered under the present invention provides maintenance management and preventive maintenance tools, application training for automation and drives, and operator training. Using computer-based training, economical education is possible located directly at the workplace and related to the actual tasks of the employees. Online programs offer an active know-how transfer. The benefits to the business are low cost training logistics, fast access to international data bases and information networks, and permanent online coaching by experienced tutors.

Conferences are utilized to provide compact expert know-how and exchange of experiences across industries and organizational functions. Personal know-how transfer and best practice sharing between participants of the conference and the speakers is promoted, experts are brought in and their experience utilized.

In preferred developments of the present invention, general contracting services are provided, for example in the plant construction of automobile and chemical industry businesses.

Another general contracting aspect of the present invention provides project planning, design, engineering, supply, erection and commissioning of electrical equipment for water supply and sewage plants, plants for production of cement and line, breweries and dairies up to and including international turnkey contract execution utilizing regional capabilities. A service offered under the present invention is the conversion of passenger and freight ships involving planning, design, engineering, erection and commissioning of electrical equipment for newly built and modification of existing passenger and freight ships.

Damage caused by fire can be rectified according to a service offered under the present invention. Emergency installation of equipment subsequent to the damaged caused by the fire, for example in the paper industry or on passenger ships, may include the supply of all necessary equipment.

On-call and logistic services are also provided. For instance, customized service for operators of port facilities including the take over of supply of spare parts and tools has an outsourcing project. Fault elimination in the automobile industry for diverse peripheral devices from different manufacturers is encompassed within the services provided. Fault elimination for circuit breakers is performed at various voltage levels. In another example, a manufacturer of electronics may utilize the present service for fault elimination, for example of WORM drives including repair of complex mechanical equipment and control electronics. Another aspect of the invention is to provide a service for accommodating date change in software and compatibility thereof.

As part of the integral plant maintenance and auxiliary process management, fault elimination for industrial plants, infrastructure and power plants are provided. The integral plant maintenance cover corrective maintenance of individual plant areas and maintenance of the entire plant and all auxiliary plants. This includes performing electrical, mechanical and civil work with a concept of business based maintenance. This includes development of a strategy through practical implementation and management. Examples of plants which can utilize the service include paper mills, power plants, automobiles production plants, coal, iron and copper open cast mining, as well as water supply plants, airports and buildings associated with industrial plants.

To ensure the integrity of electromechanical equipment, key areas such as motors, transformers, generators, switch gear and switch plants are maintained.

Management of auxiliary services are available including media supply, logistic services and industrial facilities management. Applications of such auxiliary processes are paper industry, automobile industry with parts supply, water supply industry, government and cultural centers.

In another aspect of the present invention, information technology plant solutions are provided. Real time data banks are maintained in combination with ERP integration. For example, interfacing with existing automatic casting machines in two spatially separated works in conjunction with optimization of the production process can be accomplished. ERP system communications can be conducted on an automation level by development and implementation of an all encompassing communication concept. The ERP system and the production automation equipment can be connected in communication for example in car manufacturing facilities and metal pressing and casting shops.

Industrial networks can be implemented for example in a semiconductor factory. A further application of the present concept is re-engineering of refineries, data processing in power plants, and information technology engineering and simulation for example in an automation and distributed control system.

Examples of electronic design and manufacturing services include the provision of controls for doors and lifts whereby the development design and manufacturer of complete, ready to install electronic controls for door systems and lifts are provided. Crane controllers may also be developed, specifically the crane swing controller. A further application of the electronic services is the development and manufacture of controls for canteen and restaurant equipment. Another example is electronic components in parking ticket vending machines.

All of this is tied together with knowledge management utilizing training of operating and maintenance personnel.

Logistic services ensure that the correct parts are available for the plants at the right time and the right place. As the result of customized services, quick help for users and manufacturers are insured. Logistics and on-call services are available twenty-four hours a day every day of the year.

Another aspect of the present invention is the business based maintenance as a mutually agreed concept for maintenance and management of secondary processes based on business objectives. This is useful for industrial, power and infrastructure applications. Services are provided not only for systems and plants of the provider but also for other equipment and facilities of all manufacturers.

IT solutions which are independent of manufacturer and system are tailored to the needs of the customer. Intelligent software for complex systems are customized and provided with associated data interfaces to provide all encompassing solutions between the ERP and the automation level. The information technology infrastructure can also be supplied if necessary.

Another component of the present invention is the provision of electronic design and manufacturing service for embedded electronics. Not only does the provider offer electronic plug-in cards, equipment and systems, but the provider also offers all encompassing solutions. Such complete solutions guarantee safety and reliability. Value added activities are optimized using a highly individualized approach, maximum flexibility and by tapping available synergy potentials.

A further advantage of the present invention is to develop employee know-how by is designing technical education and training programs that are individualized according to the needs of the customer using the latest methods and learning technologies.

In the general contracting component of the present invention, experienced plant experts assist in offering professional management in all stages of a project, from initial planning and design through hardware and software engineering to erection and commissioning of the plant. The present invention provides that the provider is a solution partner with technical project experience encompassing an entire spectrum and having deep rooted knowledge of different production methods. Solutions are developed for the individual customer which are capable of meeting future challenges. Maximum economic efficiency and openness to future developments is provided by modern field-proven methods and technologies. Local knowledge and a global strength are one aspect of the invention in particular. Specialists who are equipped with well grounded technical and branch specific know-how are used to develop solutions that are precisely tailored to the businesses needs. Integrating existing systems and customer-specific standard and regulations with relevant national standards and quality standards is also encompassed within the services provided.

General Contracting

In more detail, the general contracting provided under the present invention provides many solutions from a single source. Construction and/or modernization of plants and systems are met by five requirement oriented service lines. In particular, planning design and engineering of plant sections or complete plants, feasibility studies, production of software, hardware design and configuration, production of requirement specifications, production of product specifications, plant optimization, documentation, analysis of economic efficiency and productivity are all provided under this service line. Erection of the plant includes installation of pipe work and components, special construction work including mechanical equipment, construction engineering, site management, construction supervision, project management, documentation, as well as disassembly and disposal services, modernization, purchasing, logistics and transport. A service line is also offered for commissioning of plants, wherein hardware and software testing, hardware and software commissioning, startup, optimization, simulation and plant testing, project management and coordination with other works, documentation as well as training of the operating staff are available services under this service line.

Customer services management is available in coordination with third party works and with technical customer services of the provider. For example, in conjunction with a contract for purchases of electrical equipment, mechanical equipment, pneumatic equipment, hydraulic equipment, etc., a project management approach to customer services is provided.

The provider of the present invention offers turnkey production and supply of plant sections or of complete plants, branch specific solution packages with integrated software modules extending from automation through production control to the ERP/SAP level thereby providing vertical integration of the plant relocation and covering all areas from raw material acceptance to the finished product, a horizontal integration.

In a workshop line, engineering, construction and manufacturing of switch gears for power distribution and automation and drives is featured.

According to the present method, the provider accepts technical and commercial responsibility for the complete projects. Clarifying interfaces to components and coordinating all parties involved in a construction process, a functional performance of the plant is assured. Further, the provider operates within the framework of a specified cost, and agreed time schedule and an expected quality.

Thus, the solution offered according to the present method fits the goals of the business for economic efficiency and suitability to the individual plant to allow incorporation of future developments. Planing and control of production, automation of procedures, monitoring of secondary and auxiliary processes are all provided. Formulas are defined, contracts are managed, and production data are acquired so that quality can be tested and verified. In the present method, the provider works with the business in cooperation to produce suitable solutions and integrated systems throughout the entire life cycle of a plant. Such cooperation succeeds on the basis of experienced branch specialists who are available as competent partners in the vicinity of the plant, availability of technical specialists for automation, drives, power, instrumentation and information technology on a worldwide basis.

The on-call and logistics component, in detail provides customer oriented services for users and manufacturers of technical products, systems and plants that are manufacturer independent. A high availability is strived for with the lowest possible down times and failure times of the products systems and plants which is a key precondition for economic operation of the equipment. As a first component, the field service provides fault elimination on the spot. Specialists having the necessary technical know-how come to the site to solve specific problems. Short arrival times and fault clearance times are provided in conjunction with closely meshed service center networks at the plant site. Another component is a repair service which remedies breakdowns and defects in electronic and electromechanical products, components and systems through globally distributed certified repairs centers. In-house repairs are performed as well as modifications to hardware and software according to customer-specific requirements.

An on-line service provides direct help through specialists communicating directly with the technical plants via telephone and data networks or satellite links. Detection of faults is possible in the shortest time and location of the source of the faults is provided. In one example, software faults are cured by interactive transfer of programs and data.

Without the right spare parts and the right tools, qualified service cannot be performed. For this reason, logistics services are a further component of the present invention. Logistics services speed customer service missions through selective professional procurement and hold the required materials in readiness. This reduces service times and costs by intelligent linking of information logistics and warehouse management.

The individual service packages discussed above offer a wide range of customer services in addition to fault elimination. Individual service packages are defined in which various services are precisely tailored to the customers specific requirements. A case-by-case determination provides for selection of individual service packages or within the framework of a service contract. Outsourcing assistance is provided as well as accepting complete responsibility for some processes as a way to reduce or sustain processed costs.

Integral Plant Maintenance and Auxiliary Process Management

Since plant availability is of decisive importance in view of the large capital investment in production facilities, an integrated approach to plant maintenance is desirable. The present invention provides a practice-oriented concept for plant maintenance and operational control. This concept in addition to providing technical solutions also takes into account the economic aspects of maintenance and contributes to the business goals. Integration of maintenance planning and services results in a systematic increase in plant availability as well as production quality. Resolving the conflict between maintenance costs and failure costs on one hand and optimizing frequency of detection, preventative and corrective maintenance on the other hand results in an increase in bottom line profits. For industry, energy and infrastructural applications, the present services keep electrical, mechanical and civil works up to date. The present invention is focused on industrial plants, infrastructural installation, power plants, electromechanical equipment, and auxiliary process management.

Through utilization of performance based contracts, the alignment between the provider and customer is reinforced and ensures a win/win outcome. The performance based contract forms an integral part of the partnership between the provider and the customer. The rewards to the contractor are measured by key performance indicators and reflect the success in the relationship. The nature of the indicators depends on the type of the contract and the objectives of the business and are agreed in consultation with the customer. Possible key performance indicators include plant availability, production quality, reduced operating costs, and safety. In the present invention, every process is important. Even processes which are not directly related to production have a major bearing on plant availability. Such auxiliary processes are covered by a business based maintenance concept. Using clearly defined cost basis analysis, ensuring production at a full running operation in an absence of external disturbances and making a contribution to high plant earnings is possible. This permits the customer to concentrate on the core business.

Information Technology Plant Solutions

Under the present invention, best of breed products and systems are integrated and networked to achieve higher performance and availability at all levels of the customers plant. Examples of technology based information technology solutions are found in food stuffs, drinks and tobacco industry, the petroleum and petrochemical industry, the metals industry, the paper industry, pharmaceutical and specialized chemical industries, infrastructure, the production industry and power generation and distribution industries.

The present method strives for efficient plant design by providing all encompassing solutions for all functions between the management and the automation level of the plant. Creation of information technology innovations is by combination of branch specific technological know-how with information technology confidence. This results in more effective plant design so that planning can take place easily quickly and at a lower cost.

The present information technology services offer industry specific packages, referred to as branch suites, industrial consulting services, integration solutions, process technology optimization, simulation, information technology based engineering, industrial data management, and industrial networks and operations. Worldwide on-line operator control and process monitoring of plants is possible using Internet technology according to another aspect of the present invention.

Solutions For Airports

The present invention also provides solutions for airports. In particular, individual installations and systems at an airport are maintained according to the present invention, particularly with the technical functioning of the airport installations. The present invention provides trouble-free operation of the installations, including maintenance and operating services and works within a fixed budget in providing these services. Agreed key performance indicators are used to insure efficiency of performance. According to the invention, the airport operator outsources operating services for electrical and mechanical engineering, building technology and infrastructure technology.

Professional services are provided under the present invention for new airport projects including planning and engineering, transportation and logistics, procurement of materials, installation and setup, commissioning, maintenance and operation of all airport sections. The professional services are also provided for airports in operation including maintenance and operation of outsource activities. For airports in operation or under construction, managed services are provided over the entire life cycle of the airports. Thus, comprehensive solutions are provided from a single source as a general contractor.

Cost effective maintenance of the airport is available by using international project experience and high technology skills in connection with best practice sharing to insure a minimum of maintenance costs and a higher productivity. Such maintenance solutions are tailored to the needs of the owner and the airport including providing maintenance services for seasonal and project related demand peaks and for ongoing care.

Under the present airport maintenance system, six process steps are applied to develop a maintenance improvement program. The first step is to develop a business plan. The aim of the business plan is to align the maintenance services to the business needs and to insure that these are directed to common goals. The business plan includes a vision statement, a mission statement, values, objectives and key performance indicators. Once achieved, the business plan is signed off at the executive level and is communicated to all employees. The plan is displayed around the site.

A second step is to develop maintenance policies in this step, basic rules are set to be followed in providing the maintenance services. These are jointly developed by production, engineering and maintenance personnel and reflect the policies of the company. The maintenance policies are signed off by the executives of the company as well.

In a third step, key performance indicators are identified. To measure the performance of the business and of the maintenance provider, the key result areas of the business must be identified and easily and regularly measured. The key performance indicators are built into a contract incentive system to align the goals of maintenance provider with the goals of the customer.

According to a fourth step, a maintenance improvement strategy is developed. The customer and the maintenance provider jointly determine the strategies required to improve the maintenance. These strategies must be detailed with the defined actions assigned to individuals. They are also to be regularly reviewed for progress and the need for change.

A fifth step of the process is that of benchmarking to measure the performance of the maintenance provider against others and against themselves. Benchmarking of key areas of the business is provided through simple key measures. Strategies are developed to improve against the benchmark and to include the maintenance improvement strategy.

In the sixth, and final, step an organization is provided to meet the customers requirements. The organization is reviewed in detail on an annual basis. The organization must support the contract functions while minimizing the contract overhead.

Another aspect of the present invention is to provide connecting service solutions. These operating services run without the customer lifting a finger. They cover energy supply plants, electrical installations, security and safety systems, informations systems, public address and the guidance systems, telecommunications installations, baggage handling installations, runway lighting, air traffic control systems, and building maintenance systems as well as airplane maintenance hangers and terminal building technology.

The customer sees multiple paybacks from use of these airport services. Competitive advantages include: operating costs can be calculated to stay within fixed budgets, qualified specialists guarantee maximum operational safety, clear sole responsibility is provided for installed sections, increased human resource flexibility with no direct hire staff is provided, increased capital return with sell and lease modeling is provided as well, and the customer can concentrate on central airport processes without incurring training, tools or equipment costs.

Integral maintenance management supports the business goals of the customer, including minimizing maintenance costs, providing a long term high level of availability of high investment installations, minimizing break down risk to insure a high level of passenger satisfaction, providing a ready for action 24 hours a day 7 days a week maintenance system, reducing operating costs, and minimizing logistical needs.

In addition to the airport services, the present invention also provides integral plant maintenance, auxiliary process management, maintenance of electromechanical components and switch gears, maintenance and plant services for infrastructure installations, and professional maintenance support.

Services for Power Plants

The present invention likewise provides services for power plants. Using the present invention, the business targets of the power plant maintenance are attained. In particular, the present business based maintenance provides that the customers' targets become the maintenance provider's targets, quality which meets the customers' requirements including price, performance and on-time service are provided. The maintenance further assists development of operational know-how, optimizes the processes to meet the companies goals, provides the company with the latest technology to optimize availability and logistics, and reduces overall costs and maintains constant quality standards.

Figure 7:
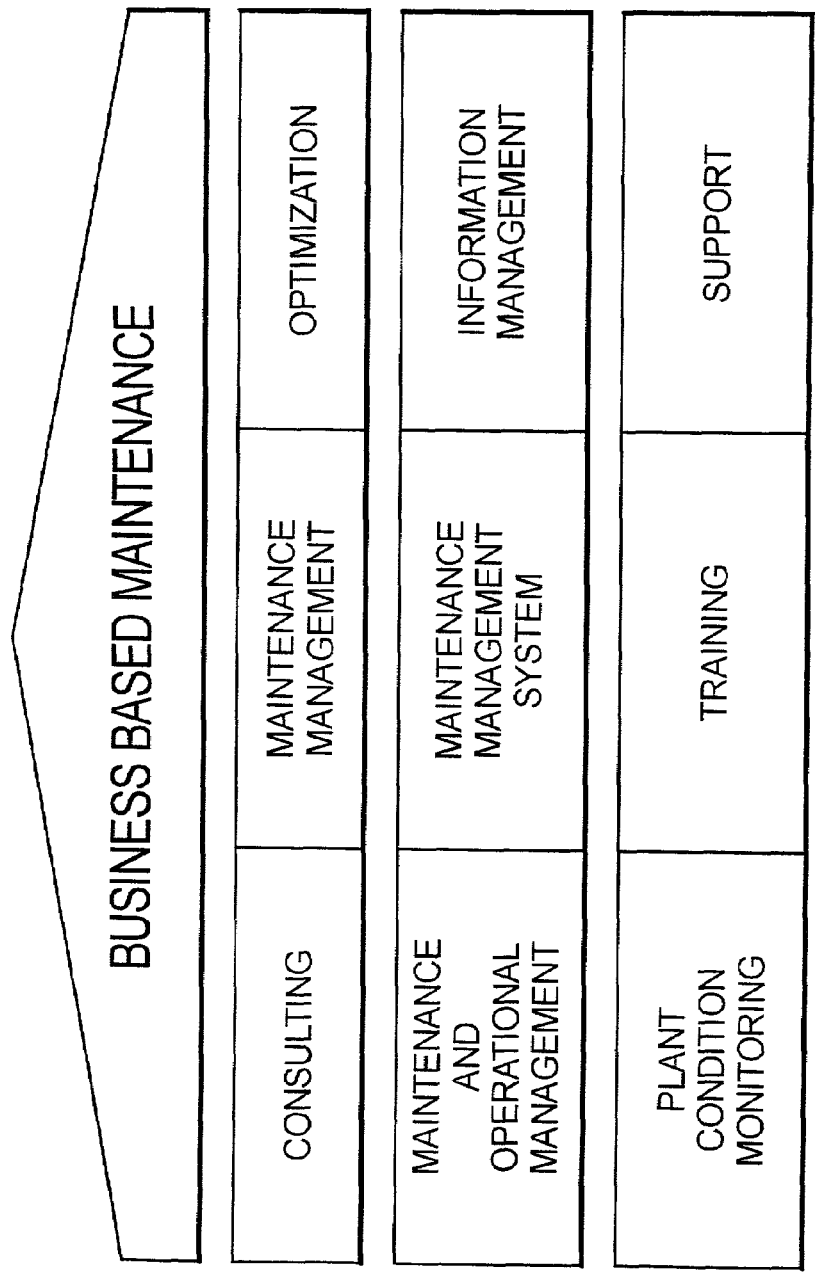
FIG. 7 is a schematic illustration of business based maintenance according to the present invention.

Referring to FIG. 7, the management system is provided for power plants as modular service packages.

In todays power plant market, crucial changes are currently taking place on a world wide basis. Deregulation of electrical power generation markets has placed supply networks at everyones disposal and has increased competitive pressures. A power plant operator is compelled to exploit every available opportunity to reduce operating expenses. In a deregulated market, only the best is good enough. Outsourced maintenance and operational services are provided to the highest standards, by specialists in engineering, technical support and business management fields. By outsourcing auxiliary processes, the power plant is enabled to optimize cost structure, which allows it to concentrate on management of core processes and valuable plant expertise while leaving the rest to qualified service providers. As a result, fixed costs are reduced.

By optimizing maintenance procedures and operational management, using dependable, professional and cost effective partnering, maintenance costs can be reduced by up to 50% for a power plant. The power plant may continually optimize the processes using business based maintenance management implementation of commercial targets according to the customers priorities. Thus, a reduction in costs of up to 50% may be available depending upon the condition of the plant.

The present invention provides maintenance services for power plants which meet entrepreneurial targets to provide optimized operational and maintenance costs. According to the present invention, servicing cycles and maintenance work are optimized according to the following principal: as much as necessary and as little as possible. This business based maintenance utilizes computer-aided diagnostics systems. The maintenance services function as an extension of the organization of the power plant to continuously improve profitability of the plant, involving the staff of the plant if the customer wishes. Long term partnership schemes are available to assist the customer in forecasting the budget.

Common objectives are provided under the present invention, including plant safety, improved return through reduction in maintenance of operating costs, extended plant life which insures a return of investment and longer payoffs, a lasting high level of plant availability, a reduction of planned and unplanned down time, preventative maintenance which is based on the plants' condition, performance enhancement, ongoing staff training, retrofitting work, emissions reduction, and minimized additional investment.

The present invention sets new standards of entrepreneurial targets for the power plant and on the basis of this information, full recommendations are made of appropriate maintenance and business strategy. State of the art methods and tools are used for organizing the maintenance processes and the staff organization which is required to implement them. Key parameters which reflect savings can be evaluated, including installed capacity per employee, annual energy output per employee, cost of operation of maintenance per Megawatt-hour generated, and plant availability.

The present invention provides operational optimization through outsourcing. Outsourcing is viewed as a holistic optimization technique which is used to increase the competitiveness of innovative industries. A fundamental principal is to have an external source that is responsible for all non-core business and which frees the customer to concentrate on the more important core processes. Under the present invention, selective outsourcing is used to fulfill the economic objectives of the power plant. A top priority of a power plant operator is to run the power plant in the most economically effective way. With economic targets in mind, concrete tasks must be defined and implemented as well as monitoring of the success of these tasks. Using a concept of the present invention, the responsibility for a variety of tasks in the power plant which are outside the field of expertise of the power plant operator are taken over by the maintenance provider. The range of services extends from management of peripheral plant maintenance right through to full plant operation covering all electrical, mechanical and business components, regardless of the manufacturer. In every situation, outsourcing is specifically mapped and designed to guarantee success and profitability.

Under the present invention, leasing schemes may be provided for auxiliary processes to enable optimization of asset management. This approach allows more flexibility when making decisions about strategic plans for the future.

A determination is made as to how much outsourcing is profitable for the power plant. The hands on experience at every plant enables the customer to rely on a single provider of services including expert advice on all servicing needs. Engineers of the provider apply skill and expertise when involved in other manufacturer's plants.

A partnership is effectively formed between the provider and the power plant which is designed to follow and assist the business goals. A decision is made as to how much maintenance work should be performed in-house verses balancing with the outside services.

This enables the plant operator to focus the intention on the actual production related processes which improve the cost structures and increase the flexibility of the resource planning of the plant. The entire operation of the power plant can be entrusted to the outside provider.

In FIG. 8 is illustrated a menu from which to choose either total or partial outsourcing of the power plant. First, a section entitled maintenance and management is provided which is broken down to devices and components, systems, and subsidiary plants. The devices may include motors or transducers or the like, the systems may include a demineralizer, air conditioning and ventilating systems or the like, and the subsidiary plants may include boilers, turbines or the like. Another option provided the customer is complete plant outsourcing.

In a second section of the menu, the operation and management of the plant is divided into systems and subsidiary plants. Under systems, such things as object safety and cleaning may be selected. Under subsidiary plants, secondary plants and the steam/water cycle may be selected. These menus are associated with a customers targets, including life cycle costs, target costs, plant availability, operational safety, and the like. Under modes of operation, operational links, maintenance windows, redundancies and the like may be provided. A further menu selection provides for selection equipment and type of devices including spare parts classification, storage, equipment access and the like. A maintenance strategy is provided which includes a plan of maintenance strategy, spare parts and logistics, a maintenance schedule, CMMS, an emergency, staff recruitment and the like.

The present invention also provides maintenance time schedules using known time scheduling software. Maintenance procedures follow on this including the generation of an estimated work schedule and then, using the maintenance time schedule, work orders, spare parts, tools, and safety measures are addressed. Documentation is also provided of the maintenance procedures.

A maintenance management system is included which looks at faults and breakdowns, plant data, generic data, analysis statistics, costs and the like.

The range of services for power plant maintenance and operational management include providing maintenance of equipment or components or complete systems. The services according to the present invention provide maintenance for subsidiary plants or even the entire power plant.

Figure 9:
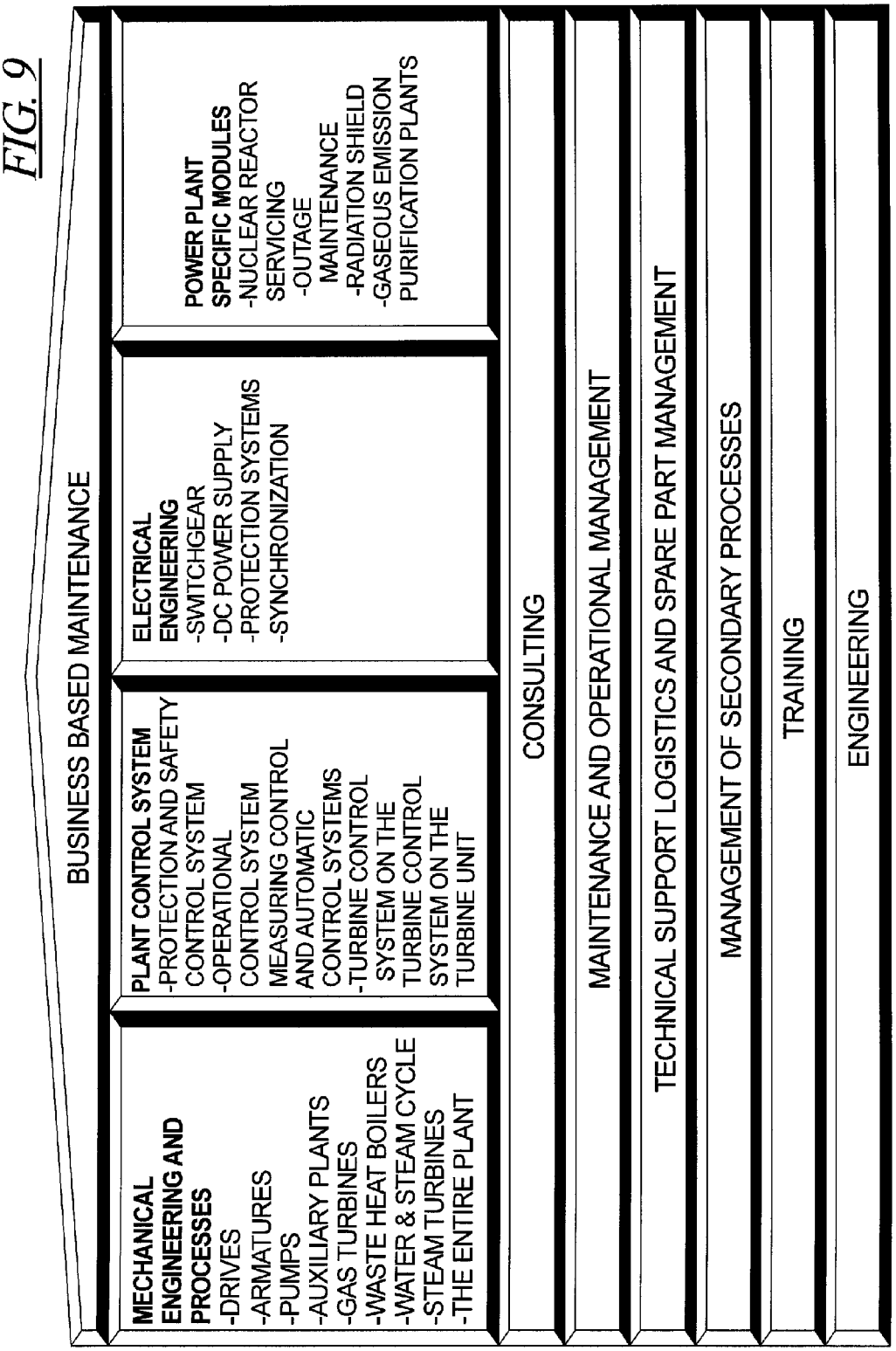
FIG. 9 is a schematic illustration of further aspects of business based maintenance.

According to FIG. 9, the present business based maintenance of power plants includes sections dedicated to mechanical engineering and processes, plant control systems, electrical engineering, and power plants specific modules. Under the mechanical and engineering processes are modules corresponding to maintenance of drives, armatures, pumps, auxiliary plants, gas turbines, waste heat boilers, water and steam cycles, steam turbines, or the entire plant. Under the plant control system portion are modules for protection and safety control systems, operational control systems, measuring control and automatic control systems, and turbine control systems on the turbine unit. Under the electrical engineering section are modules for switch gear including low, medium, and high voltage switch gear, DC power supplies, protection systems, and synchronization and exciter unit. Modules which are specific to power plants that are available under the present invention include nuclear reactor servicing modules which addressed outage maintenance, radiation shielding, and the loading machine. In addition, gaseous emission purification plants maintenance is provided as a module.

Underlying these sections are offered consulting, maintenance and operational management, technical support, logics and spare parts management, management of secondary processes, training, and engineering.

The following is a description of technical services for operational management and the maintenance of power plants. In the construction phase, all requirements for the operation of the power plant to be constructed are determined and implemented in a plan. The technical solutions required to attain the targets related to the construction of the power plant are implemented at this early stage. An objective of lowest life cycle costs is planned since all phases of the plants life and in particular the operational phase are integrated with an adapted maintenance program. The provider assists in planning and selection of proper equipment for the operation and maintenance of the plant. The operators experience in assembly, commissioning and acceptance of the plant are that the disposal of the customer, insuring a quality and efficiency of the plant.

An objective of the present invention is that the power plant functions properly from its first day. Maintenance services should be prepared before the plant commences operation. This includes establishing the necessary inspection schedules, quality manuals and procedural instructions, introducing a maintenance management system adapted to the operational requirements, setting up a uniform documentation structure and including the spare parts as part of the management strategy.

During the operational phase of a power plant, the service packages of the integral power plant maintenance program are applied. Consulting services include targets, analysis of status quo, concept consulting including technical, commercial, and maintenance partnership schemes along with leasing schemes, business strategy, definition of job specifications, agreement on implementation, recruitment of personnel, staff transfers, and controlling.

Another aspect of the operational phase is maintenance, which includes inspection, servicing, repair, and application of the latest maintenance techniques. The inspection component provides for determination and assessment of actual conditions of the plant by means of the latest measuring techniques, even during the plants operation. The servicing component provides for maintaining the operational efficiency of the plant by regular preventative measures in order to preserve the target condition of the plant. The repair aspect provides that action is taken to restore the target condition and thus achieve a specified performance of the plant. The latest maintenance techniques include condition oriented maintenance using analytical systems such as thermography, vibration measurement, and machine diagnostics. Innovative operational control and management systems are used.

A trouble shooting component includes analysis via a hot line or by teleservicing, remedial action via a hot line, teleservicing or on the spot action, and suggestions for optimization which are utilized for set up of appropriate preventative measures.

A technical backup is provided under the operational phase maintenance with workshops services, spare parts, tools and instruments services, 24 hours control center, and teleservicing. The workshop services provide repair, construction and calibration of components. The spare parts are provided including advising as to spare parts, ordering of the parts, storing and transportation of the spare parts along with all documentation therefor. Appropriate tools and measuring equipment are supplied and advise thereon is given. In the control center, the answers for reporting inquiries around the clock and return calls by qualified engineers are provided within a time limit which is stipulated. For teleservicing, on-line connections are made between the systems specialists and the process control system to enable rapid fault diagnosis and direct access to the system.

The operational management of the power plant is also provided including organization, planning and execution for those customers which select operation of systems, subsidiary plants and complete operational management of the plant. The invention provides for installation and operation of workshops, storage centers, buildings, and infrastructure which adhere to the guaranteed performance targets. These provide guarantees of availability, development of partnerships schemes which suit the individual customer requirements, and consulting of the business review processes.

The operational phase also provides for training and instruction. A draft concept is prepared with advise on training measures. Project qualification is included including a comprehensive process control and electro-technology utilization. Qualification of personnel including the maintenance manager, service manager and shift supervisors are included. In maintenance workshops, methods working conditions and work safety are reviewed.

Such management of auxiliary processes provides a new concept of work sharing. The customer concentrates on the core processes and entrusts the supporting peripheral auxiliary processes entirely to the maintenance services provider. At the customer request, the provider takes over selected partial service packages with both technical and commercial responsibility.

Another aspect of the present invention provides for modernization, or retrofitting and reconstruction of the power plant. Such retrofitting or reconstruction is based on customer targets, assessment of asset conditions, studies, and solution concepts. A plan of action is prepared including evaluating solutions, classification of interfaces, and viability of the plan. The project implementation is carried out from a single source. The provider offers planning, control, reporting services with coordination of the process sequences between the status quo and the new projects.

Another aspect of the power plant management method includes dismantling and recycling of the power plant. At the end of the commercial service life of a power plant; the dismantling of the power plant requires qualified management and specialized know-how in dismantling techniques and environmental protection. The maintenance provider may have experience in nuclear installations and guarantees that the dismantling tasks are economically undertaken in full compliance with applicable standards and regulations. An aspect of the dismantling process offered according to the present invention is decommissioning, conservation, planning the dismantling and disposal, actual dismantling, local removal of plants or equipment, and disposal in compliance with appertaining regulations. The present power plant management systems are applicable to fossil fuel power generation, nuclear power plants, and hydroelectric power plants. Maintenance strategies are developed for each, maintenance management is provided along with responsibility for spare parts, logistics, appointment of maintenance staff and operation of the plant with scheduled availability. Integrated sensors are used in power generators to collect measurements continuously during operation so that preventative maintenance actions can be taken when necessary. Continuous monitoring of the conditions on-line or telemonitoring allows the plant to operate at maximum efficiency. Utilizing the power plant management systems of the present invention, maintenance costs go down over time.

Motor Management Program

A further aspect of the present invention provides for motor management. Motor maintenance should take into account the ongoing changes resulting from globalization, technical advances and increasing competition. A broad range of maintenance services are provided which offer the following benefits to a customer: increased equipment reliability and availability, reduced costs through a proactive business based maintenance approach, minimized down time, optimized asset management, capital solutions, fast response when and where the customer needs it and energy reduction.

The motor management program of the present invention is offered at two levels. In a base level, the service modules are technology oriented and cover basic maintenance needs, while higher level options take the customer to business based maintenance solutions and turn on the special needs of the particular business. The basic modules focus on increased reliability and availability and can add to bottom line dollars which drive the customers business.

Referring to FIG. 10, the motor management program includes as its basic level modules: on-site motor services, support services, inventory management services, consulting and engineering services, and information management. For on-site motor services, condition monitoring of the motors is provided along with the 24 hours emergency response service, and preventative and corrective maintenance modules are likewise offered. The support services modules include overhaul, repair and rewind services for the motors. Motor upgrade or motor replacement supply are additional support service modules. Inventory management includes options available for inventory optimization and reduction, storage and maintenance, shared inventory, and inventory reliability verification. As a part of the consulting and engineering services block, modules include application engineering, reliability improvement, motor condition assessment, and motor management review. The information management section utilizes modules designated as system design and interface and motor data management. All of these are underlaid by a program management component.

The high end options available under the present invention will permit the customer to select options which enhance the basic modules. For instance, a capital improvement option provides asset review and improvement recommendations, achieves maintainable conditions, incorporates modem technologies, adds on to existing equipment, and provides funds to upgrade motors. This offers the benefits of increased reliability, improved productivity, and trouble free financing.

An energy reduction option features complete motor system review, optimized recommendations with projected savings, and is business focused. This reduces energy costs and reduces variance in monthly energy costs.

A performance contracting option is also available which offers tangible value-added evaluation systems, relies on key performance indicators, features an asset review and third party validation as well as scheduled reviews and provides a payment plan to which is added performance payments. This offers a minimization of risk to the customer and bonds the customer and provider in a win/win relationship. Effectiveness of the services is guaranteed through measured criteria.

A fall coverage option features asset review and repair or replacement of motors. This enables the customer to have predictable costs and offers equipment replacement including labor over the term of the service contract. Utilizing these higher level options, maintenance problems are spotted and corrected early before they develop into expensive breakdowns. Prevention, prediction, correction, inspection, and detection are aspects of the business based maintenance.

The business based maintenance is a process that defines the equipment and maintenance needs of the customer in terms of the customers business goals. The next step is to develop uniquely tailored maintenance strategies that help the customer to reach his objectives. Proactive strategies complimented by modem monitoring technologies improve equipment reliability and positively impact the bottom line of the business. The success of these changes is achieved by close working of the provider with employees of the customer to sustain improvements. A commitment is made to develop solutions that address the businesses' objectives and creates a win/win partnership with risk sharing tied to key success factors.

Technical Support Program

A further aspect of the present invention is to provide a technical support program. The business strategy of the customer is taken into account in ongoing changes as a result of globalization, technical advances and increased competition. The technical support program is a part of the strategy to develop business based maintenance. A broad range of maintenance services are offered which are designed to provide comprehensive vendor-independent solutions. The benefits of the technical support program are increased equipment reliability and availability, reduced costs through a proactive business based maintenance approach, minimized down time, optimized asset management, capital solutions, and fast response when and where the customer needs it.

As with other solutions, the technical support program offers basic service modules which are technology oriented and cover basic maintenance needs and high level options which take the customer to a business based maintenance solution that is tuned to the special needs of that business. The basic modules focus on increased reliability and availability of: power generation and distribution equipment, automation systems, drive systems, instrumentation and control, and information technology systems. These add bottom line dollars that drive the customers business.

Referring to FIG. 11, the technical support program includes module categories of support services, electrical distribution system services, and automation and drive services. Under the support services category are modules for power system studies, condition monitoring, training, routine operational checks, and emergency response. The electrical distribution systems services includes a switchboard and switch gear module, as well as modules for cable and bus way, circuit breakers and low voltage, medium voltage and high voltage switches, direct current systems, protective devices, emergency systems, routing systems, transformers, capacitors and reactors, and metering and energy management. The automation and drive services classification includes modules of control systems, SCADA systems, drive systems, automation systems, and motor control systems. This is underlain by a program management.

As above, the basic services are enhanced by high level options to insure maintenance excellence. Maintenance problems are spotted and corrected early before they develop into breakdowns. A capital improvement class of high level options features asset review and improvement recommendations, achievement of maintainable conditions, incorporation of modem technologies, and add-ons to existing equipment. Benefits of capital improvements include increased reliability, improved productivity, and trouble free financing. A reliability focused maintenance classification of high level options features alignment of strategy and criticalities, root caused failure analysis, conditioned based maintenance, business focused maintenance, and proactive maintenance strategies. These offer the benefits of cost reduction, improved reliability and availability, comprehensive databases, improved asset conditions, and motivation and team work. A performance contracting option is available which features tangible value-added evaluation systems, key performance indicators, a third party validation of asset review, and scheduled reviews. Risks are minimized while the provider and customer enter into a win/win relationship. Effectiveness is provided through measured criteria.

A further high level option is full coverage which features asset review and equipment placement. This provides the customer with predictable costs, equipment replacement including labor over the term of the contract, and reduced inventory. These high level options are focused on prevention, prediction, correction, inspection, and detection under the umbrella of business based maintenance.

The business based maintenance is a process which defines the equipment and maintenance needs in terms of the business goals. A uniquely tailored set of maintenance strategies are developed which help the customer meet the objectives. These proactive strategies are complimented by modem monitoring technologies to improve equipment reliability and positively impact the bottom line. To offer sustained improvements and develop solutions which address the business objectives of the customer. Risk sharing is tied to key success factors in a win/win partnership.

Plant Maintenance Technology Architecture

Another aspect of the present invention to offer a plant maintenance technology architecture. The plant maintenance technology architecture is formulated to meet market demands with trend setting factors including shareholder value increases due to cost awareness, increases in consequential shut down costs, increases in the volume of safety, environmental and certification instructions. Customers expect global and standardized services. Factors which are critical to success include process analysis and plant know-how, a network of maintenance competence, pooling of resources, standardized maintenance methodology, and cross sector best practices. This leads to increased customer benefit. In-house maintenance is decreased while business based maintenance is increased.

Figure 12:
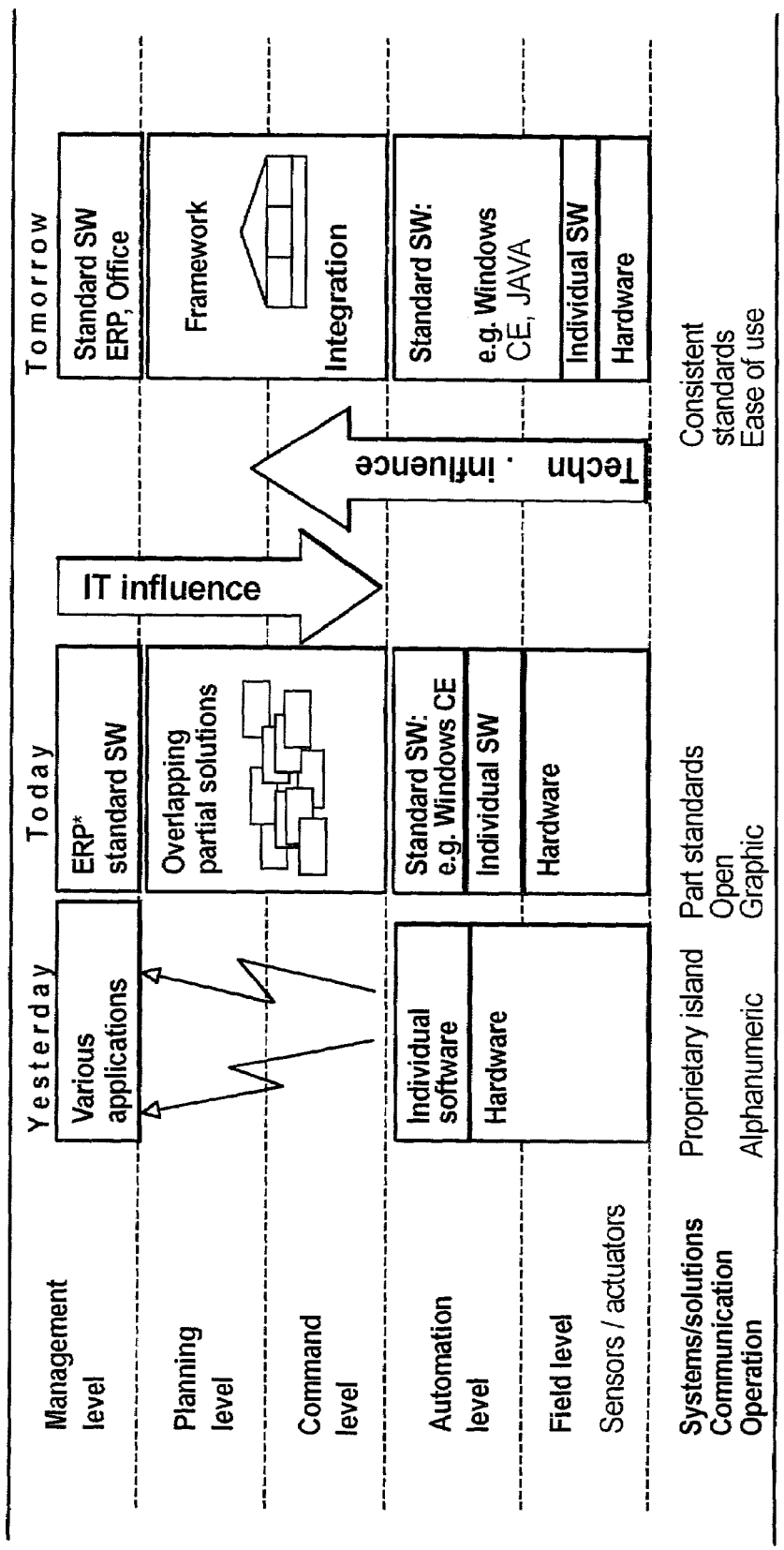
FIG. 12 is an illustration of integration of information technology according to the present invention.

Referring to FIG. 12, information technology integration and software standards are decisive as competitive factors in industry. The present invention provides an integration framework linking standard software at the management level and to the automation level through a planning level and a command level. Reliance on individual software and on hardware is reduced. Information technology influence is driven top down from the management level while technology influence is driven upward from the field level. Consistent standards and ease of use are realized.

Plant maintenance technology architecture has as objectives the creation of standardized procedures and reference processes, the development of assessment models as a decision basis for business based maintenance. It defines, structures and implements the frame-work for methodological knowledge acquisition. Further it provides an integration concept for universal and global information technology support. Plant maintenance technology architecture includes as components computerized maintenance management systems (CMMS), maintenance decision support (MDS), conditioned monitoring systems (CMS), digital control systems (DCS), score card optimization systems (SOS), and machinery information management open systems alliance (MIMOSA). In additional, it utilizes enterprise resource planning (ERP), manufacturing resource planning (MRP), engineering data management (EDM), and enterprise asset management (EAM).

Referring now to FIG. 13, an overview of data and archives is provided maintenance decisions support is offered through a communication link to maintenance management systems and through another communication link to condition monitoring and digital control systems which in turn offer processes for intelligent field devices.

An overall concept behind plant maintenance technology architecture is to provide an umbrella under which is offered methods and processes, knowledge based business processes, and knowledge based technical processes. Underlying these is integration which uses standards and innovative information technology solutions and provides global, consistent and uniform provision of information. The methods and processes offer a design of a uniform maintenance process, establishment of standards for globally applicable methods and reference processes, and development of assessment models both in the technical and in the commercial sense. Such development may include life cycle costs. The knowledge based business processes implement asset management concepts, target maintenance strategy definitions and implementations, collect and consolidate existing know-how, and derive best practices from business and maintenance processes. The knowledge based technical processes offer increased productivity of plants, systematic utilization of plant know-how, modules for decision support, and performance monitoring.

The methods and processes portion define and harmonized the plant maintenance technology architecture. Process descriptions for definition of the maintenance programs and applications of method are offered. Definition of reference processes and cost models are utilized as standards. A determination of key metrics are made for process evaluation. A process module for systematic acquisition and dissemination of the know-how is available. The creation of an internal communication and training concept is also applied.

The knowledge based business processes offer scalable solutions for asset management in accordance with the relevant requirements. Establishment of a score card-based optimization system for maintenance strategy is done. Implementation and transfer of the strategy results to the operative management system using computerized maintenance management systems is accomplished. Know-how generation modules for a strategic performance differentiation are provided in addition to a leading competitive edge through certified maintenance management.

The knowledge based technical processes offer total productive maintenance and optimization of the plants based on continuous improvement processes. On-line performance monitoring of the plants is offered. The development of a maintenance decision support methods and modules for diagnosis, optimization and residual life estimation are offered. An integration of existing databases containing descriptions of the product, system or plant behavior are available for technical modeling. For example, these relate to wear models. For a commercial condition monitoring, preparation of an evaluation model and competence structure is provided.

Integration of all of the foregoing is accomplished through development of a plant maintenance technology information model, taking standards and strategic system platforms into account. Evaluation of and active support of important standardization activities are accomplished in the maintenance system. Innovative technologies for teleservice and virtual team support are provided. Effective mechanism for experience exchange and knowledge management are installed. And lastly, piloting of methods and solutions modules with selective customers is performed. Each of these is accomplished by repeated reference to a manual of procedures.

The plant maintenance technology architecture is built on a pyramid, the base of which is provided by the methods and tools which are overlaid with the processes and topped off by the process manual.

Various aspects of the present invention include the following:
SIMAIN Maintenance of Infrastructure and Traffic Systems
SIPLANT Plant establishment
SI-73 73 73—Technical industrial customer service
SIMAIN Maintenance and sub-process management
SIT_Industry IT solutions for industry
SERVTRONIC Customized electronics
SIBRAIN Knowledge management
Terotechnology and Technical Services A competitive advantage is provided by maintenance outsourcing. When an airplane lands in Buenos Aires, in London, Copenhagen or Lisbon, when the traffic is routed through the inner cities or Rome or Athens, when the sky train travels through Bangkok or the LRT through Kuala Lumpur—we are always contributing. As the largest provider of technical services for industry, energy and infrastructure, Siemens provides professional maintenance services in the whole world. And not only for Siemens systems and plants but, extending beyond manufacturer, for all machines and equipment of infrastructure and traffic systems. With SIMAIN Business Based Maintenance, the new maintenance concept, we can also optimize the efficiency of your maintenance for you.

The customer is asked Is Maintenance part of your core business?

Plant maintenance is and remains a very complex topic for operating and maintenance of airports and airlines, ships and harbor systems, equipment and systems for road and rail traffic.

It is indispensable for business success. But it requires involved work and management processes and causes considerable costs. Let's compare your situation: Dependent on the sector, maintenance currently makes up 5-40% of the ongoing costs! A consistent rationalization of your maintenance is all the more interesting the greater the impact of this expense. Efficiency can be enhanced now without loss of quality. However: The full scope of this potential can be realized for you only when maintenance is pursued like a profitable core business.

SIMAIN Business Based Maintenance—Our Systematic Solution

Siemens offers professional maintenance services worldwide. And not only for Siemens systems and plants but, extending beyond manufacturer, for all products and systems in your company. Siemens is thus one of a very few vendors of maintenance services that can be found everywhere—technically and geographically.

The SIMAIN performance spectrum covers: structured action, solutions individually customized to client wishes, one-time processes and procedures, maintenance strategies that are defined and mutually agreed upon.

Less complexity, greater focus on your core competencies, enhanced performance and cost savings—SIMAIN Business Based Maintenance. The Results Add Up For You
PRODUCTIVITY
YIELD
COSTS
YEARS With Siemens as a partner and the SIMAIN maintenance concept, you create results that matter long-lasting performance enhancement as a result of more efficient maintenance. Your plant profitability grows by 10-50%. 10-30% fewer maintenance costs.

SIMAIN—successful in many sectors, including: airports, airlines, maritime shipping, harbor systems, rail traffic systems, road traffic systems, automobile industry, mining, chemistry, infrastructure for logistics operations, paper and wood pulp, steel manufacture, water and sewage systems. With 296 branches in 69 countries, we can unite the two for you: global collaboration and on site service. Large or small doesn't matter—we have the solution tailored to you. Learn more about SIMAIN Business Based Maintenance. You are more successful with SIMAIN Business Based Maintenance. Your Maintenance Partner for All Shops. Do not coordinate a number of special service providers in an involved way. Siemens is your maintenance partner for all system technologies—inter-shop for: electrical engineering, machine and construction shops. The advantages for you are obvious: as a result of inter-manufacturer know-how, we, as general contractors, can also provide all work to keep traffic facilities, harbor systems, ships and airports on the cutting edge. You—entirely individually—determine the scope of the technical responsibility that Siemens assumes for you. The proven concept behind this is always the same: it is SIMAIN—the business goal-oriented maintenance.

SIMAIN Business Based Maintenance

SIMAIN is a concept that individually aligns all maintenance activities to the given objectives of your business. As our employer, for example, you thus achieve more productivity, higher system availability, increased company yield.

We make your entrepreneurial goals our own in order to directly derive all technical services you need—and all of this at low cost.

Key to Success: The collaboration is absolutely success-oriented. In the framework of a win-win partnership, Siemens collaborates with you in designing performance-related upgrading systems. The improvements that are achieved can be measured via key performance indicators (KPIs) and be paid for accordingly. Your success is thus our incentive. The nature and weighting of these performance indicators always depends on the content of the contract and the business objectives you relate thereto. In case of a complete outsourcing of the system maintenance, for example, the following performance indicators are standard: dependability, availability, reduction of the operating costs. The weighting of these key performance indicators depends on your individual business goals and wishes.

Plannable Services, Surveyable Costs: A transparent cost calculation forms the basis of SIMAIN. A contracting at fixed prices is also possible for regular jobs. Finally, you can realistically plan your maintenance costs and always have a timely cost control available.

. . . the SIMAIN concept: A fitness program for your technical systems.

With these six steps for applying the "Fitness Plan" to your company and your systems, you are always in condition for global competition
SIMAIN—Fitness for Your Systems The SIMAIN Fitness Program Business Plan Bases maintenance on the business goals. Developed at the management level and communicated to all participants.

Maintenance Contract

Regulates the implementation of the maintenance measures. Defined in common with production, technology and maintenance.

Maintenance Optimization Concept

Defines the strategies in common for ongoing improvement of the system performance and for lowering costs.

Organization

Defines the optimum organization for meeting the desired goals and avoiding (load) spikes.

Performance Indicators

Measures the progress in performance on the basis of important productivity demands.

Benchmarking

Compares the performance to the competition and others.

The SIMAIN Concept: Agreement, Success-oriented Contracts, Business Goals, Customer The Customized Modular Performance Offer Maintaining Infrastructure and Traffic Systems: Ships and harbors, Airports, Traffic systems, Performance Packages, Corrective Maintenance, Integral Maintenance Programs, Administration and Maintenance, Special Service, Energy Supply, Electromechanical Systems, Security Systems, Logistics and Replacement Parts, Decontamination and Waste, Buildings and Grounds, Optimization and General Repair, IH Technologies, Controlling and Reporting, Personnel, Financial Services.

The SIMAIN concept offers you the possibility of selecting exactly those services that satisfy your demands—from complete outsourcing up to individual special services and support services.

System Maintenance from A to Z

Siemens offers you complete system maintenance for your electrical and mechanical facilities, supply and waste facilities as well as for your building technology as needed.

We Put Your Individual Performance Package Together

All of our maintenance services can be compiled into a customized package entirely as you want. To this end, we offer the request combination of: corrective maintenance, integral maintenance programs, administration and maintenance, on the basis of our Special Services. Additionally, you can use our two special programs for the areas of electromechanical maintenance: Technical Support Program (TSP), Motor Management Program (MMP). We would be glad to present these two programs to you in detail. Please simply ask for our special brochures.

Special Services

You can use the special services listed below for each of our performance packages. These maintenance services are oriented according to typical system technologies and components that you can have managed individually or integrated. Selection and scope are based entirely on your needs.

Energy Supply

All systems and system components that have to do with high-voltage, medium voltage, low-voltage, block heating power plant, emergency diesel generating, etc.

Electromechanical Systems

All of the electromechanical systems that internally or externally make your systems run (for example, air conditioning and ventilation, conveyor systems, etc.)

Security Systems

Preventive maintenance for the dependably functionality of your systems such as access control, video monitoring, fire alarm system, baggage inspection, etc.

Logistics and Replacement Parts

We see to it that your capital is optimally used.

Decontamination and Waste Disposal

Professional cleaning of electrical printed circuit boards and electronic equipment as well as the maintenance of waste disposal systems such as, for example, sewage systems.

Buildings and Grounds

We offer the complete range of services from interior and exterior cleaning service to the repair of damage to buildings and roads.

Optimization and General Overhaul

In order to enhance the productivity and availability of your systems, we help both with optimization and modernization of your systems as well as with a general overhaul.

Support Service

In the maintenance concept of SIMIAN, the support services form an important foundation. They are oriented to technology-independent services in the framework of modem maintenance. The gain is individually paid out for you.

Maintenance Management strategy development and optimization, maintenance planning systems Audit Inspection of Previous Maintenance Using our process know-how, we can support you in objectively evaluating your own organization and in designing optimization plans.

Know-How

In order to guarantee worldwide best-practice knowledge and experience, we have set up an Intranet information network, Maintenance Technology condition assessment, online sensor mechanisms, decision analysis tools Training maintenance management, technologies for predictive maintenance, maintenance systems Finance Controlling and Reporting meaningful analyses of previous contractual procedures and farther-reaching prognosis Personnel Recruiting and management of employees who are responsible for the maintenance. By accessing our support services, you can profit directly from the worldwide experience that accompanies SIMAIN from numerous sectors of industry.

SIMAIN Maintenance of Airport Systems

Integral Maintenance Services for All Airport Facilities and Systems

Whether it's a matter of ground control, baggage and freight logistics, passenger information systems or of security and building technology, transport equipment, technical services, administration and maintenance or other areas—Siemens Industrial Services is your capable and dependable partner for everything between landing and take-off. And as one of the very few companies worldwide, we have references available in all areas.

We offer you both: great experience and technical expertise in dealing with all standard systems, processes and technologies. Our services extend from maintenance up to full operating responsibility for all airport areas. We can define the SIMAIN services specifically for you, so that the business and operational demands of your airport are guaranteed for the entire period of use. Of course, we assure that all international rules and standards for security, health and environmental protection are met.

System Components of the Air Side front equipment, 400 Hz, navigation lights, ground current supply, docking equipment, ground radar, primary and secondary, statistical, navigation aids, airstrip navigation lights, control systems for airstrip navigation lights,ground movement guidance system with pre-planning.

System Components of the Land Side electrical security system, ACS control, CCTV (cable television), fire alarm system, inspecting passengers and baggage, burglar protection

I & C

PABX, radio and television, loudspeaker system, display system for flight is information, data network, building automation system, baggage transport, check-in, building guidance system, power supply, high-voltage, low-voltage, lighting (navigation lights), generator, emergency power supply, diesel unit, USV, energy distribution, mechanical systems heating/ventilation/air-conditioning, elevators, conveyor belts, fire-fighting systems Structural Engineering buildings, landscape design (potentially also: interior design), furniture, auxiliary equipment, road construction.

SIMAIN Maintenance of Shipping and Harbor Systems

Ship Maintenance Sets Sail with SIMAIN

Siemens is an ideal partner for shipping companies. As a globally acting service vendor, we are in the position of collaborating with you centrally as well as regionally. The entire fleet can be cared for everywhere in the same hands under conditions fixed worldwide—which leads to corresponding cost advantages. Alternatively, collaboration can also be carried out project-by-project or per individual ship or by region. In any case, SIMAIN guarantees that all work will be carried out according to internationally certified quality standards.

Tested On-Board Security

Machines, appliances and operational systems are subject to constant wear. They must therefore be expertly checked for functionability and operational dependability. In order to avoid longer, unplanned standstill times, SIMAIN offers a regular check of the ship technology.

Examples of Managed Ship's Systems: generators, switching systems/power switches, power management, monitoring systems, complex automation systems, diesel-electrical travel systems, remote control for marine propulsion systems, electronics assemblies, all types of electrical machinery, control equipment, navigation systems. SIMAIN Harbor System Maintenance for Shorter Berthing Times Harbors are currently in open competition. The most modern, computer-controlled systems that guarantee a complete loading and unloading of arriving ships within hours are needed in order to prevail. A functioning infrastructure, and efficient cost management and the non-bureaucratic handling of all processes are other prerequisites. Siemens Industrial Services is the technical service vendor with whom you can perform these jobs better.

The present invention offers the customer:

cost-efficient maintenance of all harbor systems and important system parts, responsible operation of secondary processes (energy supply, management of the industrial acilities, among others) with the harbor operations at a fixed price flexible relief for spikes in personnel needs complete assumption of the maintenance responsibility for systems at a fixed price (i.e., SIMAIN guarantees the system availability.

Examples of Managed Harbor Systems: automated cranes, mobile harbor cranes, rail cranes, ship's cranes, container cranes, semi-portal cranes, bridge cranes, slewing cranes, slewing rocker cranes, crawler cranes warehouse facilities, generators, information systems, communication systems, transport systems, malfunction alarm systems systems, fire protection systems.

Collaboration with locally residing specialists as well as with your existing maintenance personnel is, of course, possible.

SIMAIN Maintenance of Road and Rail Traffic Systems

Everything is Dependably Managed with SIMAIN

You're looking for a reliable service partner for your infrastructure traffic projects? One whose core competence is high-efficiency maintenance? One who can cover high-tension and weak-current systems, automation and communication technology with all applicable mechanical and structural projects? As a technical services provider for infrastructure traffic systems, we have many years of experience in the maintenance of road and rail traffic solutions worldwide. This international best-practice know-how will also pay for itself for you. Your advantage:

You receive the overall maintenance services from the same hands for all units and technologies regardless of manufacturer. You are centrally handled by one contact partner and no longer have to bother with technical details—we contractually see to it that everything's top notch. We offer you the customized service package exactly as you want.

Going to Bat for You Globally and Locally

As overall vendor, we also collaborate locally with ideally qualified partners. Our respective local partners know the regional conditions and use this knowledge for you—cooperating with other partners, handling the authorities and exploiting good connections. You optimally use the resources, eliminate costs and speed up processes.

We'd be glad to inform you. With our worldwide network of Siemens branches, a competent contact is always close to you.

Rail Traffic

We offer you the complete spectrum of maintenance services for all typical systems and facilities: power supply, telecommunication, signalling technology, SCADA, ticketing, station equipment, vehicle motors, warehouse and workshop.

Road Traffic vehicle lights, pedestrian lights, high tower lights, flashing lights, intersection equipment, detectors, control systems, computers/control panels.

Systematically to Better Results

Innovative Tools for Efficient Maintenance

In order to be able to deliver the desired results, the SIMAIN process runs on the basis of a computer-supported maintenance management system. Business plan, maintenance policy and optimization strategy serve as input that is subsequently transferred onto the existing systems. The maintenance plan thus arises as result. It is the basis of the computer-supported maintenance management system. It defines the maintenance activities, the methods and the frequency with which they are carried out, and this is done for every component of your system we manage.

SIMAIN Makes it Possible to Plan Productivity Enhancements

With SIMAIN Business Based Maintenance, you use best-practice methods and techniques that have proven themselves worldwide for the maintenance of your systems: preventive maintenance, high degree of planned measures, use of pre-planning maintenance tools and systems, development of long-term optimization strategies for increasing efficiency, qualified, trained personnel, costs can be largely planned, analysis of causes of outages, modem, highly developed planning systems, meaningful evaluation and reporting Business Plan Process Analysis Criticality Analysis Component Documentation Outage Analysis Maintenance Plan Maintenance Management System Your Collaboration with Siemens Pays for Itself Many Times Over 1. Numerous Experts We deliver best-practice know-how that we have acquired in countless projects. To your advantage, we utilize modern communication systems that mobilize the expertise that we concentrate in the various competency centers worldwide.

2. Motivated Teams

Pronounced self-responsibility as a result of a very flat hierarchy and a strong customer orientation—for which our declared performance indicators also establish the yardsticks—characterize the successful way in which our employees approach the common tasks.

3. Proven Maintenance Strategies

We pursue proven strategies in order to achieve the conversion from reactive to pre-planned maintenance.

4. Information—the Performance-Enhancing Factors

It doesn't matter what system you're currently using, our teams knows how to build on this to implement a maintenance management system that improves analysis and reporting.

5. Innovative Diagnosis Tools

The use of partly unique measuring methods and diagnosis method makes it possible for us to exactly identify the actual condition of your systems and machines.

6. Core Competence Avoids Training Costs

Maintenance is our core business. This competence in all aspects of the associated tasks means time-savings for you in the introduction of an efficient maintenance.

7. Individual Contracts Based on Customer Needs

The scope of maintenance services, the performance-dependent perks, the responsibility for system operations, the nature and application of financing models such as, for example, sale and lease-back, up to the transfer of sub-systems, secondary processes and spare parts logistics . . . working together, we can individually select the package significant to you from a multitude of modularly constructed maintenance packages.

8. Worldwide Replacement Parts Distribution and After Sales Service—in Your Name, Too Use our high-efficiency, global distribution network for replacement parts. When and where one of your systems is "standing" makes no difference—we're there right away with the needed part. You can call our service center round-the-clock 365 days a year—in over 69 countries.

Worldwide Support

Let's Talk About Your Needs:

We offer you a maintenance service that is individually matched to your company and cares for each of your systems and devices—regardless of manufacturer and technology. Our Maintenance Service Is Right Around the Comer: 296 branches-69 countries Ask About Other SIMAIN Service Profiles on the Following Topics analgesic maintenance maintenance of electromechanical components and switching systems Power plant maintenance Sub-process management Sub-Process Management—for success without limits Always Nearby We have a world-encompassing network—composed of Siemens offices, supporting points, logistics centers—and can therefore always guarantee fast and competent on site service. We are there for you worldwide in all questions regarding the topic of sub-process management.

The entire world of maintenance with 296 locations in 69 countries of the world.

We are establishing new standards in the field of industrial standards with global best-practice sharing. Leave nothing up to chance and use our know-how to your advantage. Efficiency enhancement by sub-process management.

Further SIMAIN Performance Profiles About Maintenance Topics

Integral plant maintenance

Power plant maintenance

Maintenance of electro-mechanical components and switching systems

Maintenance for infrastructure systems

Call us or simply send us an e-mail and you will immediately receive the requested informational material.

We, of course, are always available to you for individual advice on all questions about maintenance.

Enhanced Efficiency as a result of Sub-process management

SIPLANT

System installation

SI-73 73 73—Technical industrial customer service

SIMAIN—Maintenance and sub-process management

SIT_Industry—IT solutions for industry

SERVTRONIC—Customized electronics

SIBRAIN—Knowledge management

Terotechnology and technical services

Your success is our goal

Your sub-processes are our core expertise

You focus your

Core Process . . .

. . . we take care of your

Sub-processes

Productivity

Liquidity

Process costs

Capital liability

Enhance your productivity and liquidity—with Siemens Industrial Services

Industry and economy are in transition. Ongoing globalization and greater and greater competitive pressure in all fields are confronting companies with great demands. Suppliers, manufacturers and dealers organize and coordinate inertial processes as well as the corresponding interfaces anew in order to open up cost-reduction potentials and adapt to the changing market demands. This restructuring of organization and production ultimately leads to a logical "concentration of core expertise".

The "make or buy" decision of sub-processes is thereby a critical element. We take care of your sub-processes in the fields of energy, facilities and replacement part logistics!

By outside contracting of these necessary processes that, however, are not viewed as core expertise (sub-processes), productivity and flexibility of the overall production process can be permanently improved.

Further, sub-processes in the industrial milieu often involve not inconsiderable capital sums that are reflected in fixed assets and therefore do not directly improve the liquidity of a company. Investments for modernization and optimization of your sub-processes can often not be realized because of lack of funds and amortization times that are too short.

Siemens Industrial Services, together with Siemens Finance & Leasing offers you the operation, maintenance and financing for you sub-systems so that you can efficiently carry out these measures and your systems remain profitably up to date tomorrow—and all of this independently of manufacturer. We focus our know-how for technological and finance related solutions and lasso a performance package for your sub-processes that is adapted to your needs.

Enhance your productivity and liquidity—with Siemens Industrial Services

Logistics Service

The maintenance of industrial production systems and buildings plays a significant part in preserving the economic feasibility of you production process. Your maintainer is thereby confronted by the greatest range of logistics tasks during the course of offering materials, tools and replacement parts. The dependable and economical handling of these processes is ultimately a co-defining factor for the performance of your maintenance.

Siemens Industrial Services offers you comprehensive logistics services in the scope of its technical industry customer service!

Merely "storing, administering and moving" does not do justice to your demands; we therefore "manage" your
  C-parts, ancillary and operating materials
  Measuring devices and instruments
  critical/non-critical replacement parts according to your individual need profile
  Reaction and availability times
  Security and cost aspects
  Stochastic needs
  Range considerations
  Based on your logistical need profile, we offer you:
  preparation, delivery, disposition
  central warehousing, DP-supported stock management, available delivery
  Purchasing, financing, (leasing, usage agreements), rental service, operation of warehouses, recycling
  You profit because of long-lasting improvement of your maintenance process and your cost situation:
  Fixed costs become variable costs
  Logistics process costs are reduced
  Reduction of capital commitment by optimizing your turnover and investment capital
  As a result of a logical application of our "supply chain philosophy, your classic personnel0intensive and capital-intensive magazine develops from a rigid material pool into an event-related, efficient supply function.

. . . so that everything is there when, where and how you need it!
  C-parts, ancillary and operating materials
  Measuring devices, instruments
  Non-critical replacement parts
  Critical replacement parts
  Receiving goods
  Commissioning
  Goods dispatching
  Stock management
increasing
  Materials' availability
    productivity
  availability of capital
decreasing
  Capital commitment
  Fixed costs
  Variable costs
Full speed ahead for your production!
Sub-process management and financial services hand-in-hand—synergies that pay for themselves As a result of the connection of technical and financial services, entirely new possibilities are opened up for successfully encountering the demands of our industrial society. For opening up these possibilities, both technical and technological competencies as well as financial know-how are absolutely necessary.

It is not only the required competencies that merge due to the collaboration of Siemens Industrial Services and Siemens Finance & Leasing.

On the contrary, we are the service provider who guarantees you security and flexibility in financing and service provision. Rely on long-term security united with flexibility and creativity and use our new service offer in sub-process management. Get the freedom for your company that you need!

Comprehensive optimization of your sub-processes—including productivity enhancement From competent consulting and conceptualization through realization—we help you to comprehensively optimize your sub-processes. Potentially arising investments for optimizing or modernizing your sub-processes are realized by us with the assistance of individual financing or leasing models. Thus, we contribute to preserving your liquidity and resources and increasing your productivity at the same time.

The Sale & Lease-back Model—Ideal for Your Profit Balance

You can also reduce your fixed costs further by leasing. A convincing leasing model has already proven itself many times here: You sell us your process-related system modules and lease or rent them back. The availability of these modules is thus guaranteed for you. Over and above this, however, you have permanently increased your liquidity and, thus, your investment latitude.
Core process
Energy Service
. . . Synergies that pay for themselves!
Sub-process management—a service offer you can count on, individually and innovatively!

Although other modifications and changes may be suggested by those skilled in the art, it is the intention of the inventors to embody within the patent warranted hereon all changes and modifications as reasonably and properly come within the scope of their contribution to the art.

We claim:
1. A computer-implemented method for providing maintenance services by aligning maintenance policies to business objectives of a customer, comprising the steps of:
(a) Performing an operational analysis to produce a diagnostic assessment of a potential customer's facility, wherein the diagnostic assessment identifies specific equipment and site maintenance requirements, wherein the equipment and site maintenance requirements are based on equipment categorized according to information technology, mechanical, electrical and HVAC;
(b) Determining processes utilizing the specific equipment identified in (a) above, and performing a criticality analysis that categorizes the processes as either critical or non-critical based on the impact a failed process has on the operation of the customer's facility;
(c) Performing a component identification of specific components that constitute the equipment utilized in the critical processes identified above;
(d) Analyzing the failure modes of the components identified in (c) above and determining which analytical technique or combination of analytical techniques is necessary to predict a component failure,
wherein the failure analytical techniques are at least one of: vibration, thermography, ultrasonic, oil analysis, motor current or alignment;
(e) Proposing an outsourced maintenance package, wherein the outsourced maintenance package includes providing one or more of the following services to the customer's facility: remote monitoring of facility equipment conditions; on call services that dispatch resources to the facility for providing maintenance, reconditioning of equipment, diagnostics and testing, spare parts, decontamination and management of motor fleets; wherein the outsourced maintenance package is based on providing maintenance support necessary for successful operation of the critical processes identified in (b) above
(f) Proposing a guarantee for providing the outsourced maintenance package in (e) based on calculating a numerical value based on a weighted average of the facility's key performance indicators, wherein the key performance indicators are at least one of numerical metrics of safety, facility availability, production quality and reduced operating costs, wherein said numerical value calculated is guaranteed to exceed a threshold;
(g) Establishing agreement with the potential customer to provide maintenance according to the outsourced maintenance package of step (e) and the guarantee of (f) above;
(h) Providing maintenance at the customer's industrial facility according to the agreement of (g);
(i) Further providing 24 hours a day, 7 days a week remote support by utilizing regional facilities that are located in at least three geographic regions around the world such that the regional facilities are staffed during normal daytime business hours; wherein the remote support provides the following services to the customer facility:
  (1) providing on call support of expert advice; wherein the expert advice is provided by the regional facilities based on the information contained in a knowledge database; wherein the knowledge database utilizes historical information based on other, similar industrial facilities or components
  (2) providing remote condition monitoring of the components identified in (c) utilizing at least one of the analytical techniques identified in (d); wherein the remote condition monitoring is further enhanced utilizing the knowledge database;
(j) Benchmarking the customer facility's key performance indicators against comparable other facilities to improve the performance of the maintenance provider against the benchmark.

2. The method of claim 1, further comprising the steps of: providing a single headquarters location; and providing Internet connections between said single headquarters location and said regional facilities.

3. The method of claim 1, wherein said regional facilities are provided for at least three regions, said three regions being: the Far East, the European Union and a NAFTA country.

4. The method of claim 1, wherein said regional facilities supervise manpower requirements for said customer's facility.

5. The method of claim 2, further comprising the steps of transferring program modules from said regional facilities to said customer's facility through said Internet connections.

6. The method of claim 2, further comprising the step of: providing supervisory control of maintenance services at said customer's facility from said regional facility through said Internet connections.

7. The method of claim 1, wherein said customer's facility is an airport.

8. The method of claim 1, wherein said customer's facility is a power plant.

9. The method of claim 8, wherein said power plant is one of: a fossil fuel plant, an atomic energy plant, and a hydroelectric power plant.

10. The method of claim 1, wherein said outsourced maintenance package further includes providing human resources support to said customer facility.

11. The method of claim 1, wherein said outsourced maintenance package further includes providing maintenance training to personnel based at said customer's facility.

12. A computer-implemented method for providing maintenance services by aligning maintenance policies to business objectives of a customer, comprising the steps of:
(a) Performing an operational analysis to produce a diagnostic assessment of a potential customer's facility; wherein the diagnostic assessment identifies specific equipment and site maintenance requirements, wherein the equipment and site maintenance requirements are based on equipment categorized according to information technology, mechanical, electrical and HVAC;
(b) Determining processes utilizing the specific equipment identified in (a) above, and performing a criticality analysis that categorizes the processes as either critical or non-critical based on the impact a failed process has on the operation of the customer's facility;
(c) Performing a component identification of specific components that constitute the equipment utilized in the critical processes identified above;
(d) Analyzing the failure modes of the components identified in (c) above and determining which analytical technique or combination of analytical techniques is necessary to predict a component failure,
wherein the failure analytical techniques are at least one of: vibration, thermography, ultrasonic, oil analysis, motor current or alignment;
(e) Proposing an outsourced maintenance package, wherein the outsourced maintenance package includes providing one or more of the following services to the customer's facility: remote monitoring of facility equipment conditions; on call services that dispatch resources to the facility for providing maintenance, reconditioning of equipment, diagnostics and testing, spare parts, decontamination and management of motor fleets; wherein the outsourced maintenance package is based on providing maintenance support necessary for successful operation of the critical processes identified in (b) above (f) Proposing a guarantee for providing the outsourced maintenance package in (e) based on calculating a numerical value based on a weighted average of the facility's key performance indicators, wherein the key performance indicators are numerical metrics of safety, facility availability, production quality and reduced operating costs, wherein said numerical value calculated is guaranteed to exceed a threshold;

(g) Establishing agreement with the potential customer to provide maintenance according to the outsourced maintenance package of step (e) and the guarantee of (f) above;

(h) Providing maintenance at the customer's industrial facility according to the agreement of (g);

(i) Further providing 24 hours a day, 7 days a week remote support by utilizing regional facilities that are located in at least three geographic regions around the world such that the regional facilities are staffed during normal daytime business hours; wherein the remote support provides the following services to the customer facility:

(1) providing on call support of expert advice; wherein the expert advice is provided by the regional facilities based on the information contained in a knowledge database; wherein the knowledge database utilizes historical information based on other, similar industrial facilities or components (2) providing remote condition monitoring of the components identified in (c) utilizing at least one of the analytical techniques identified in (d); wherein the remote condition monitoring is further enhanced utilizing the knowledge database;

(j) Benchmarking the customer facility's key performance indicators against comparable other facilities to improve the performance of the maintenance provider against the benchmark.

* * * * *